United States Patent

Morimoto et al.

[11] Patent Number: 5,941,930
[45] Date of Patent: Aug. 24, 1999

[54] NAVIGATION SYSTEM

[75] Inventors: Kyomi Morimoto; Yukiyoshi Suzuki; Hitoshi Asano; Akimasa Nanba; Yasunobu Ito, all of Anjo, Japan

[73] Assignee: Aisin AW Co., Ltd., Anjo, Japan

[21] Appl. No.: 08/971,366

[22] Filed: Nov. 17, 1997

Related U.S. Application Data

[63] Continuation of application No. 08/482,844, Jun. 7, 1995, abandoned.

[30] Foreign Application Priority Data

| Sep. 22, 1994 | [JP] | Japan | 6-228086 |
| Sep. 22, 1994 | [JP] | Japan | 6-228087 |
| Sep. 22, 1994 | [JP] | Japan | 6-228173 |

[51] Int. Cl.$^6$ ............................................. G06F 165/00
[52] U.S. Cl. .................... 701/201; 701/208; 701/211; 340/990; 340/995
[58] Field of Search ................... 701/201, 207, 701/208, 209, 210, 211, 212; 340/988, 990, 995

[56] References Cited

U.S. PATENT DOCUMENTS

| 5,115,399 | 5/1992 | Nimura et al. | 364/449 |
| 5,337,244 | 8/1994 | Nobe et al. | 364/449 |
| 5,365,449 | 11/1994 | Kashiwazaki | 340/990 |
| 5,471,392 | 11/1995 | Yamashita | 364/443 |
| 5,537,324 | 7/1996 | Nimura et al. | 340/995 |
| 5,544,061 | 8/1996 | Morimoto et al. | 364/444 |

FOREIGN PATENT DOCUMENTS

| 0 559 355 | 9/1993 | European Pat. Off. . |
| 42 19 171 | 1/1993 | Germany . |
| 2-187898 | 7/1990 | Japan . |
| 3141499 | 6/1991 | Japan . |
| 5303335 | 11/1993 | Japan . |

OTHER PUBLICATIONS

Patent Abstracts of Japan, vol. 18, No. 587 (P–1824), Nov. 10, 1994 & JP–A–06 215296 (Aisin AW Co Ltd;Others: 01), Aug. 5, 1994. (English Abstract).

Patent Abstracts of Japan, vol. 13, No. 488 (P–954), Nov. 7, 1989 & JP–A–01 195314 (Sumitomo Electric Ind Ltd), Aug. 7, 1989. (English Abstract).

Patent Abstracts of Japan, vol. 18, No. 129 (P–1703), Mar. 3, 1994 & JP–A–05 313580 (Sumitomo Electric Ind Ltd), Nov. 26, 1993. (English Abstract).

*Primary Examiner*—Tan Q. Nguyen
*Attorney, Agent, or Firm*—Burns, Doane, Swecker & Mathis, LLP

[57] ABSTRACT

A navigation system includes input means (1a) for entering a telephone number; an information storage device (3) for storing telephone-number data (3a), in which a location name inclusive of a set of coordinate is stored for each telephone number, address data (3b) in which an address is stored for each set of coordinates, and map data (3c); a central processor (4) having telephone-number retrieval means (4a) for retrieving, from the information storage device, location coordinates and location name of a telephone number entered by the input means, and address-data retrieval means (4b) for retrieving address data corresponding to the location coordinates of the telephone number entered by the input means; and display means (1b) for displaying a location name and address, which have been retrieved by the central processor, as well as a map centered on the location. Designation and entry of a location are performed by displaying the location name and address retrieved by entry of a telephone number, as well as the map centered on said location, on the display means. Since the amount of data is broken up into the telephone-number data and address data, the amount of telephone-number data can be reduced.

16 Claims, 44 Drawing Sheets

FIG. 6A

Telephone-number data

| Number (n) of toll/local office numbers | |
|---|---|
| 1 | Toll/local office number |
| | East longitude & north latitude of representative location |
| | Map display scale |
| | Registered telephone number adress, size |
| | Landmark address, size |
| | ⋮ |
| n | |

FIG. 6B

Registered telephone number

| Number (m) of registered telephone numbers | |
|---|---|
| 1 | Subscriber number |
| | Name |
| | East longitude & north latitude of location |
| | Map display scale |
| | Registered location number |
| | ⋮ |
| m | |

FIG. 6C

Landmark data

| Number of landmark data genres (l) | |
|---|---|
| 1 | Genre name |
| | Location data address, size |
| | ⋮ |
| l | |

FIG. 6D

Location data

| Number (k) of location data items | |
|---|---|
| 1 | Location data name |
| | Leading of location data name |
| | East longitude & north latitude of location |
| | Map display scale |
| | Registered location number |
| | ⋮ |
| k | |

| Registered location classification | | Number in classification |
|---|---|---|
| Generally registered location | | |
| Classified telephone directory | ○ | |

| Number (n) | |
|---|---|
| 1 | Lower-left east longitude coordinate |
| | North latitude data adress |
| ⋮ | ⋮ |
| n | |

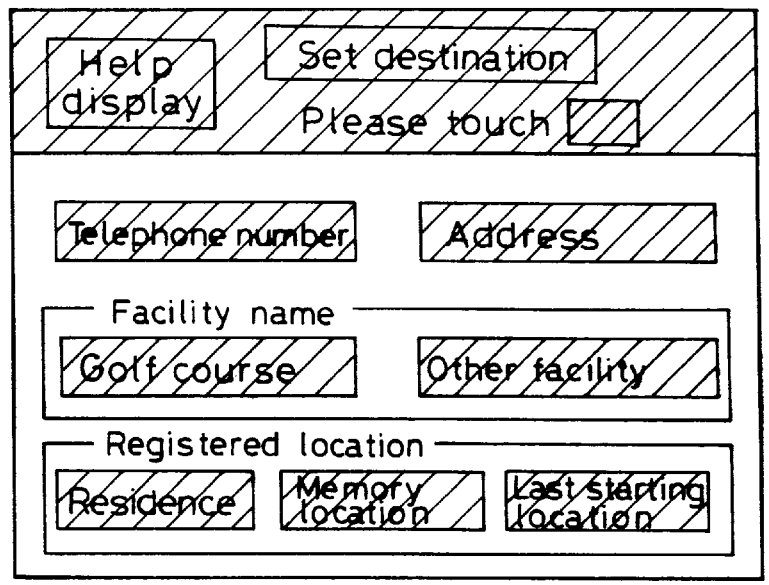
FIG.12(a)
FIG.12(b)
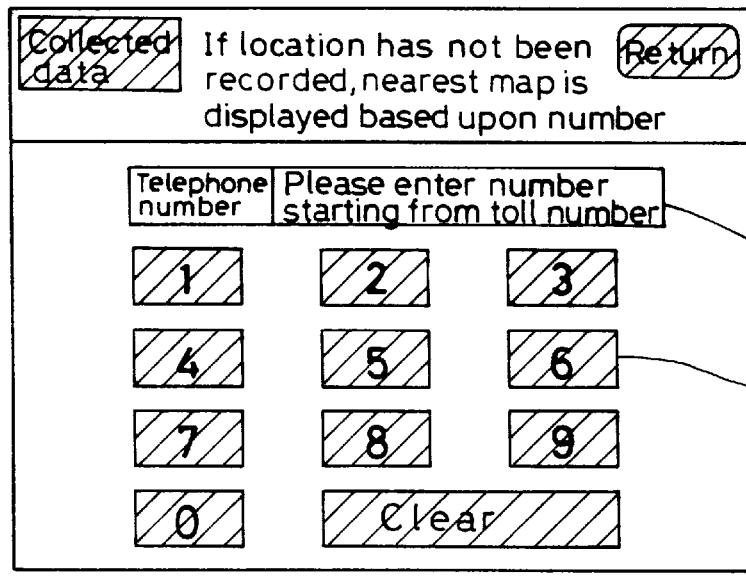

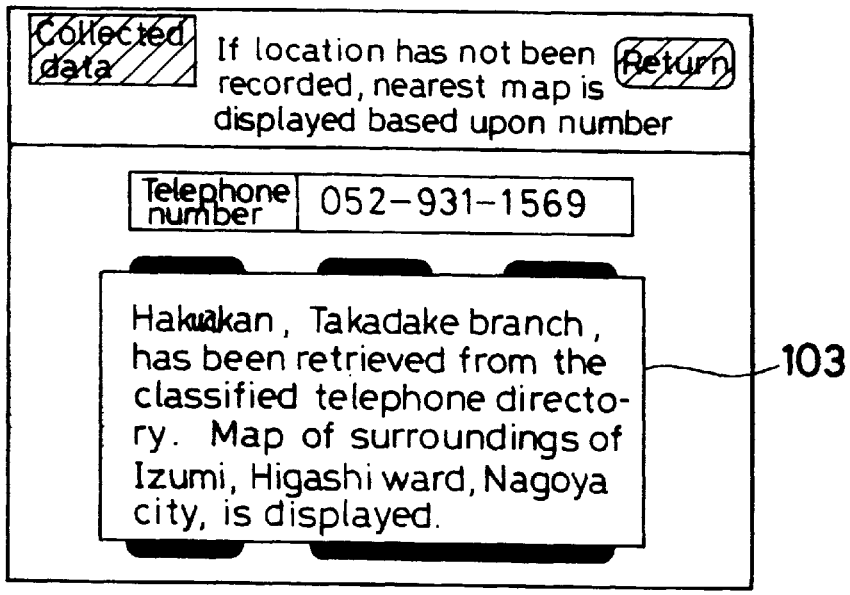
FIG.14A
FIG.14B
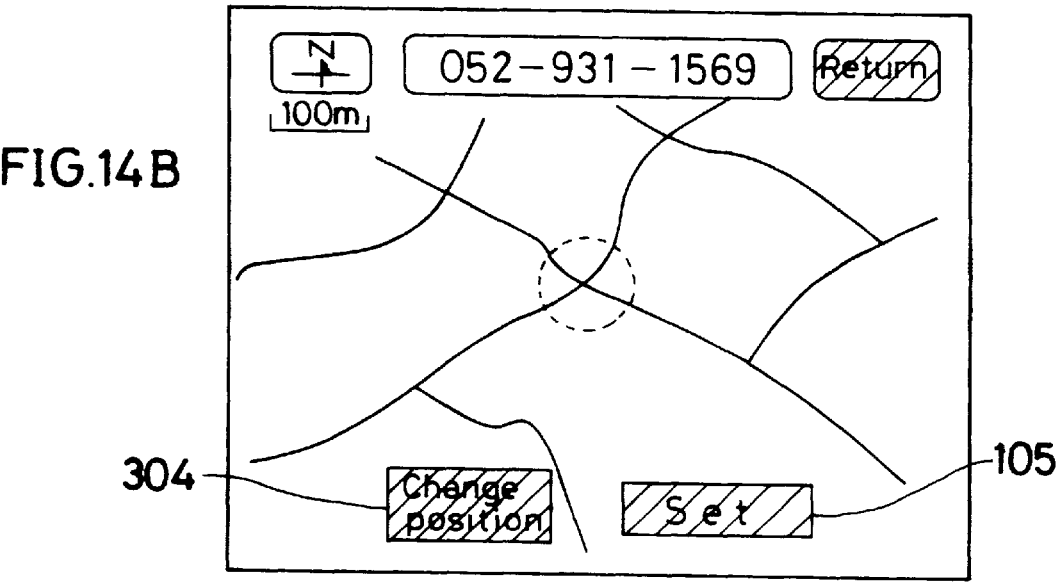

FIG. 15

Index data

| Number(n) of genres | | |
|---|---|---|
| 1 | Genre name | |
| | Location data address, size | |
| | ⋮ | |
| n | | |

FIG. 15

Location data by genre

| Number (m) of items of location data | |
|---|---|
| 1 | Location data name |
| | Reading of location data name |
| | East longitude and north latitude of location |
| | Map display scale |
| | Registered location number |
| | ⋮ |
| m | |

Flow for acquiring memory location name

※ Example of location registration from telephone number

FIG. 20A
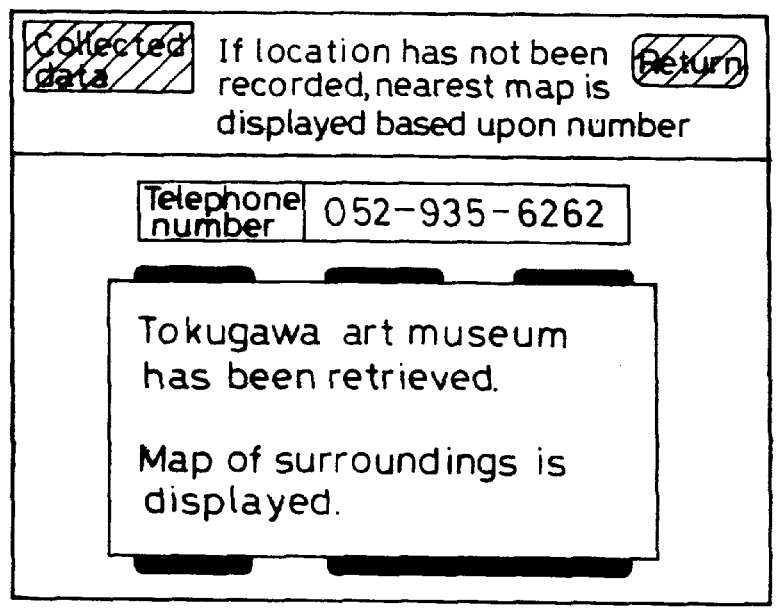
FIG. 20B
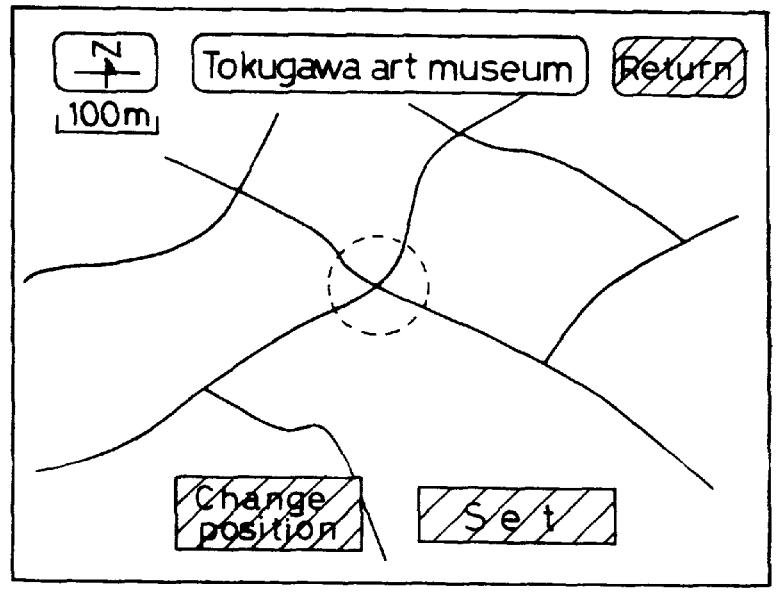
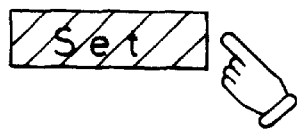

FIG. 22A
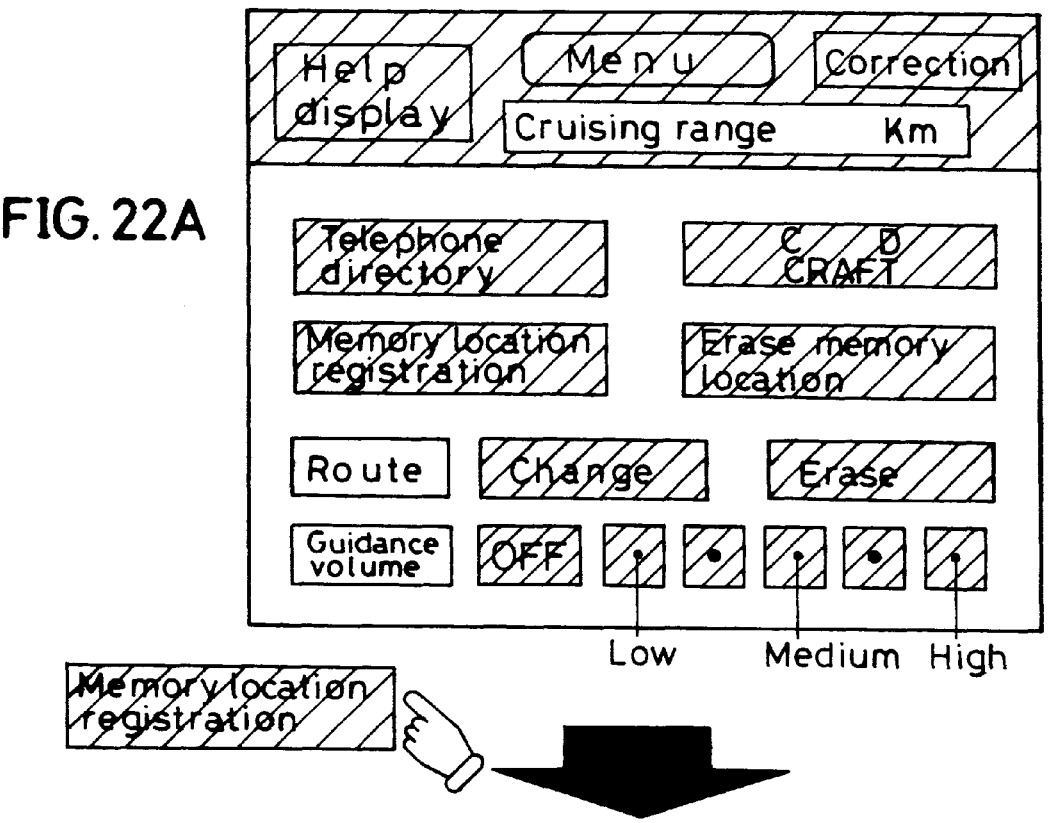
FIG. 22B
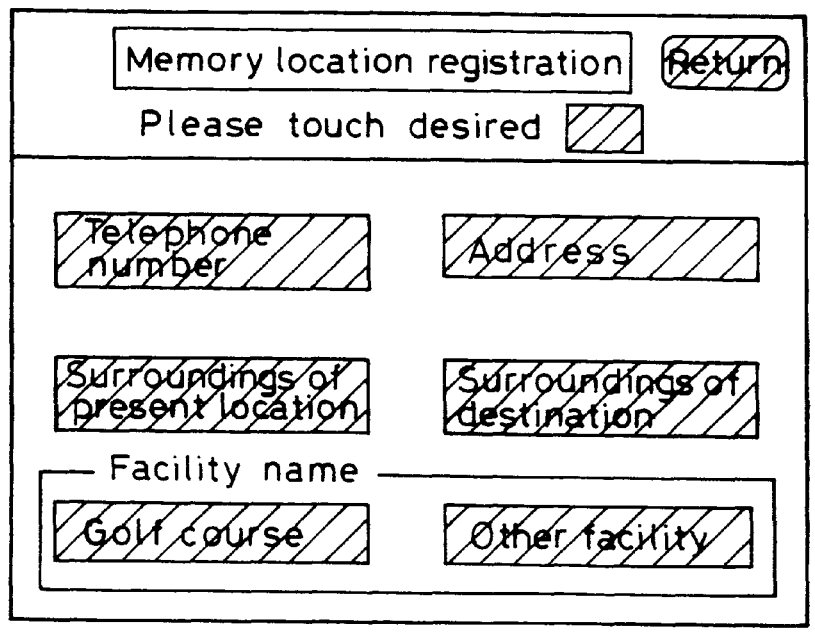
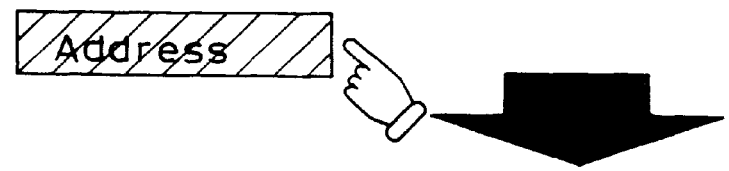

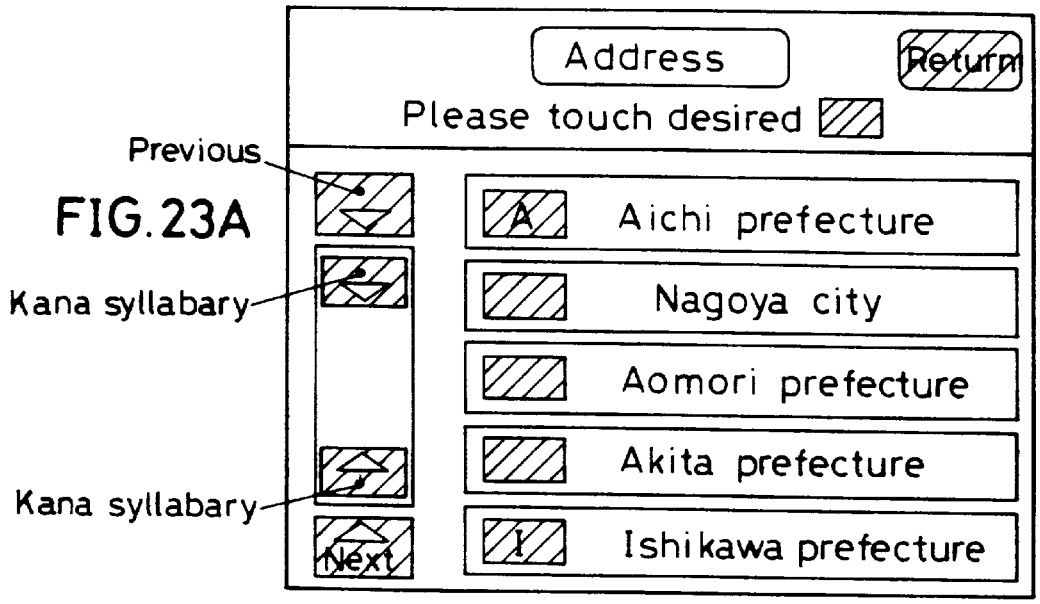
FIG. 23A
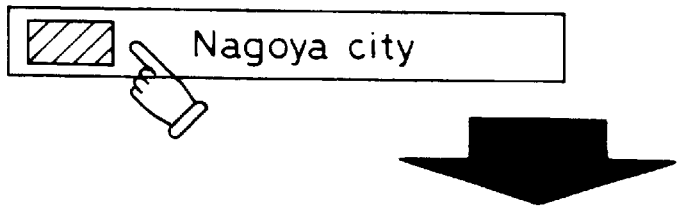
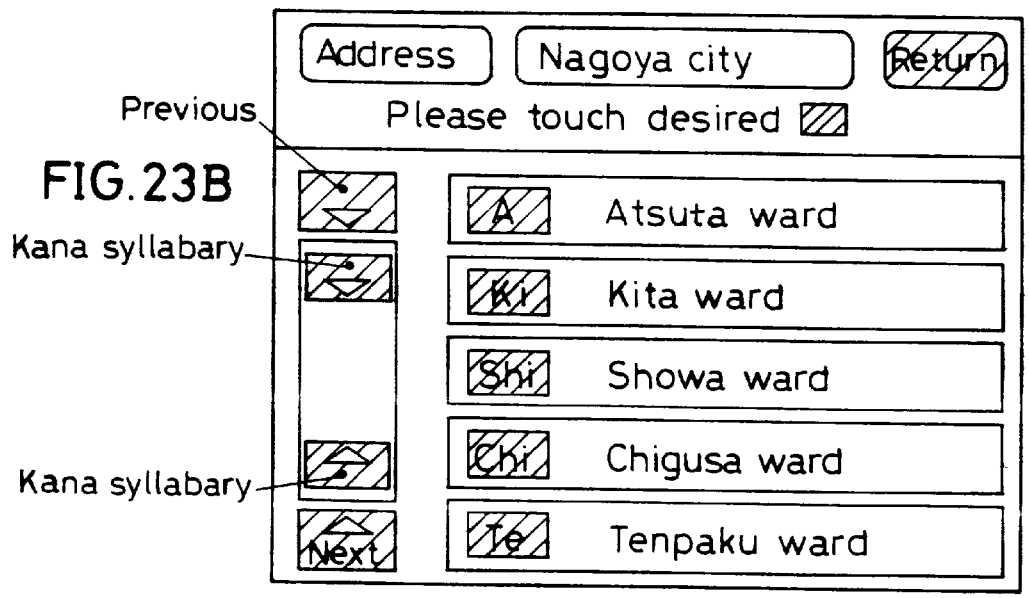
FIG. 23B
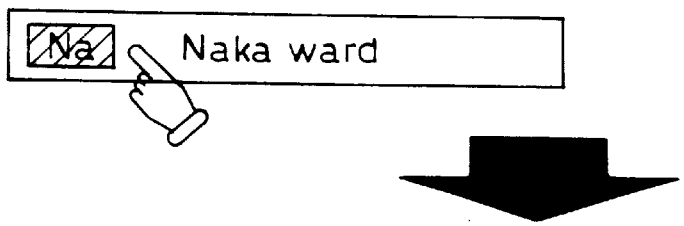

FIG. 24A
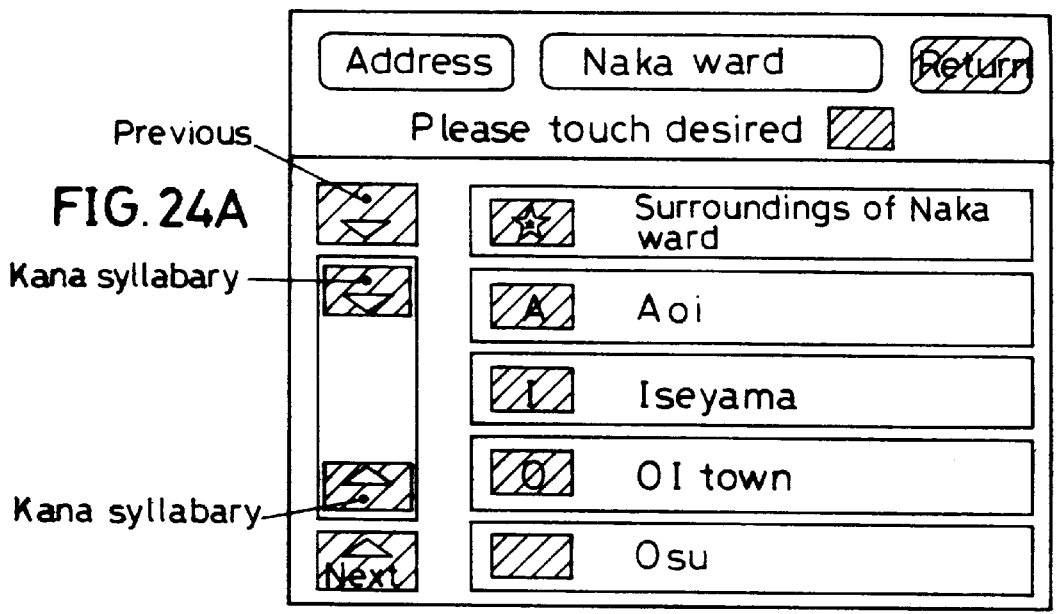
Previous
Kana syllabary
Kana syllabary
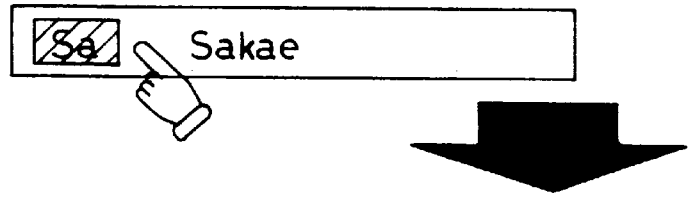
FIG. 24B
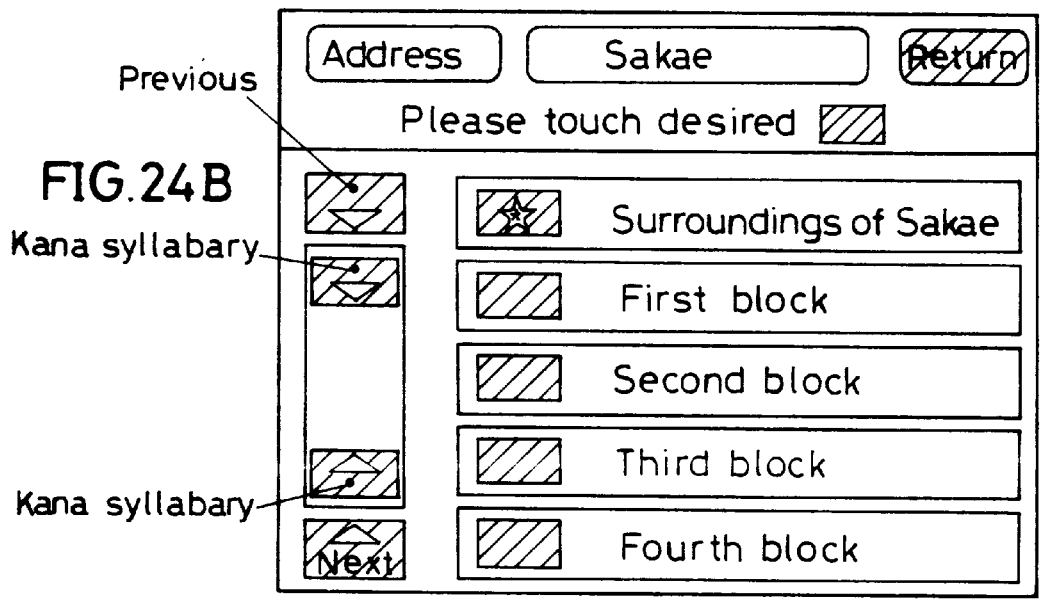
Previous
Kana syllabary
Kana syllabary

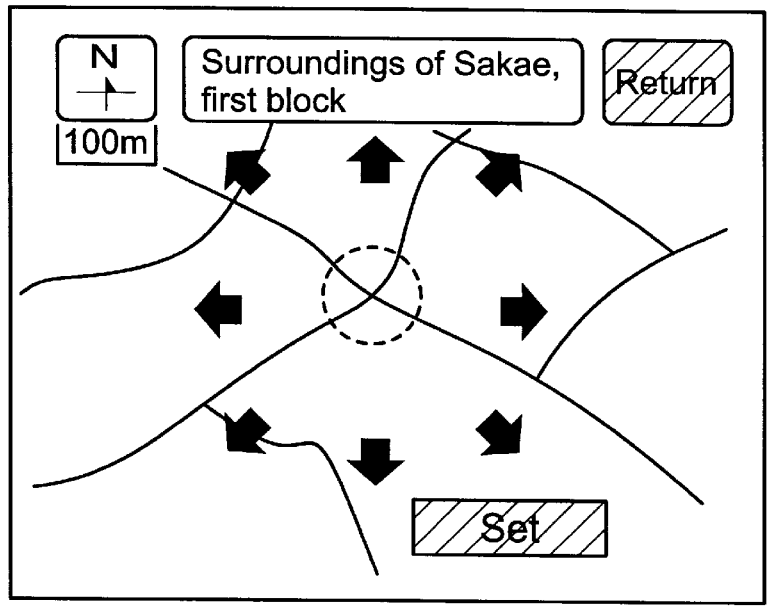
FIG. 25A
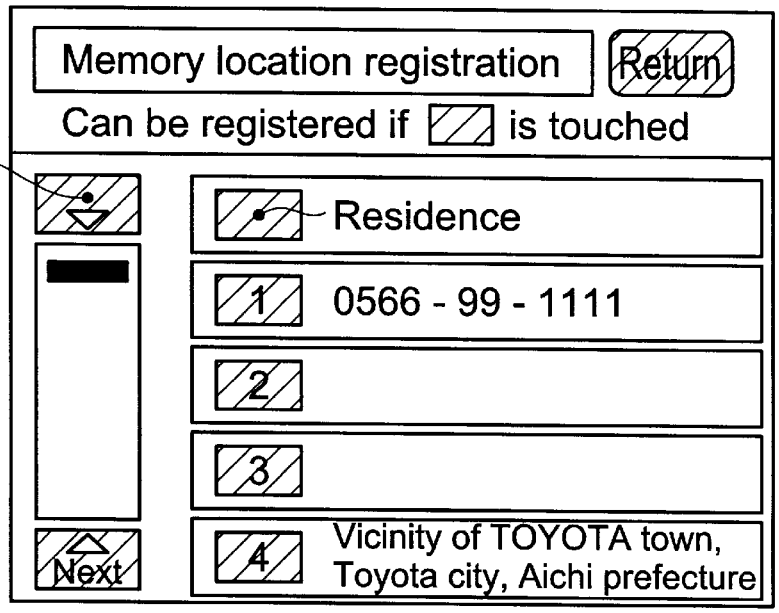
FIG. 25B
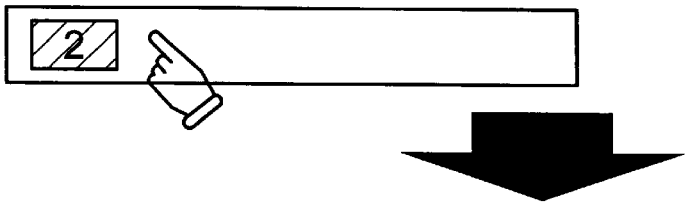

FIG. 26

| | Memory location registration | Return |

Can be registered if ▨ is touched

- Previous ▽
- ■
- Next △

| ▨ | Residence |
| 1 | 0566 - 99 - 1111 |
| 2 | Vicinity of Sakae, first block, Nagoya city, Aichi prefecture |
| 3 | |
| 4 | Vicinity of TOYOTA town, Toyota city, Aichi prefecture |

FIG. 27A
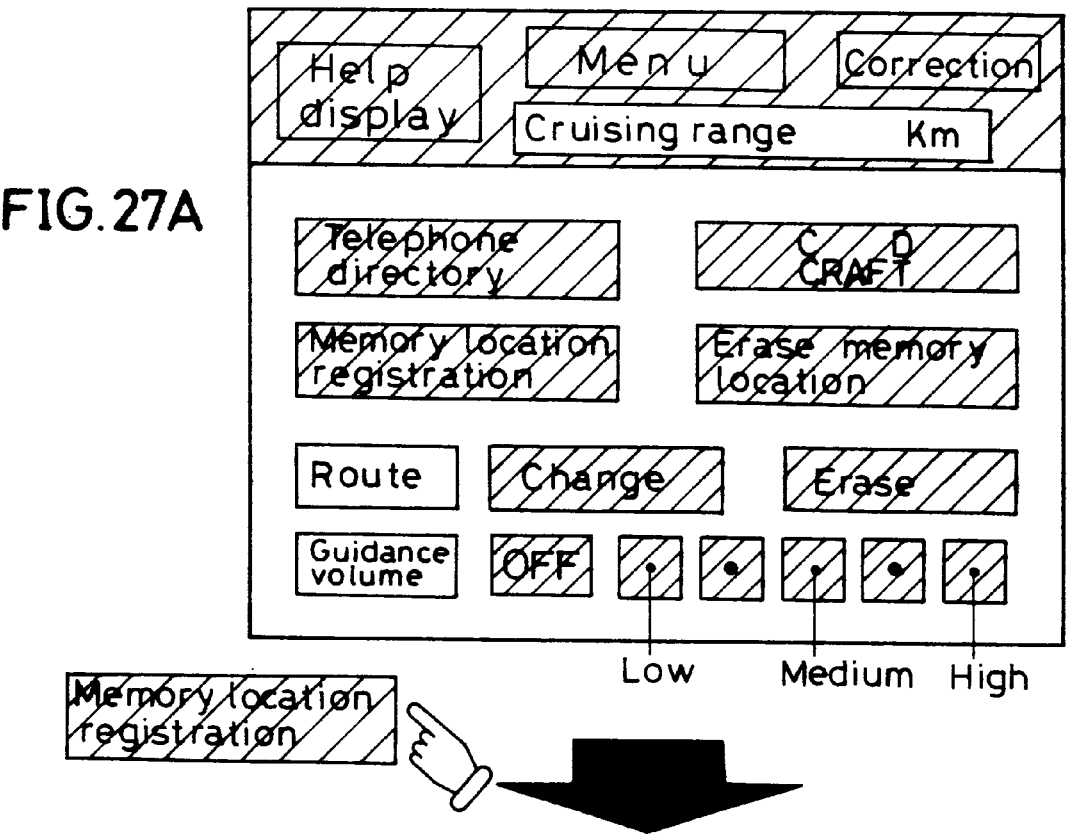
FIG. 27B
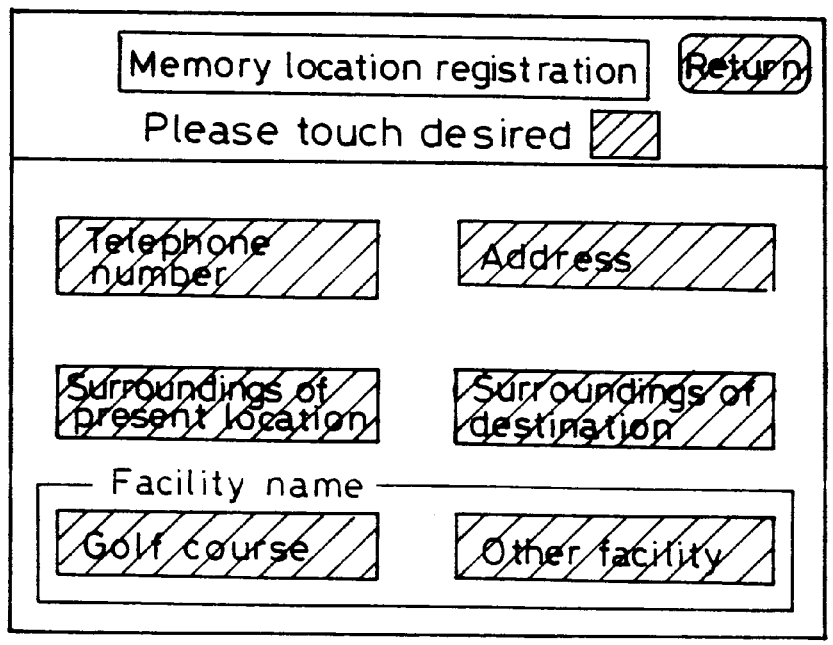
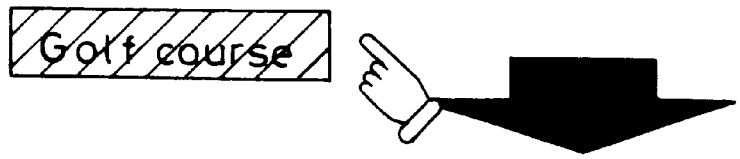

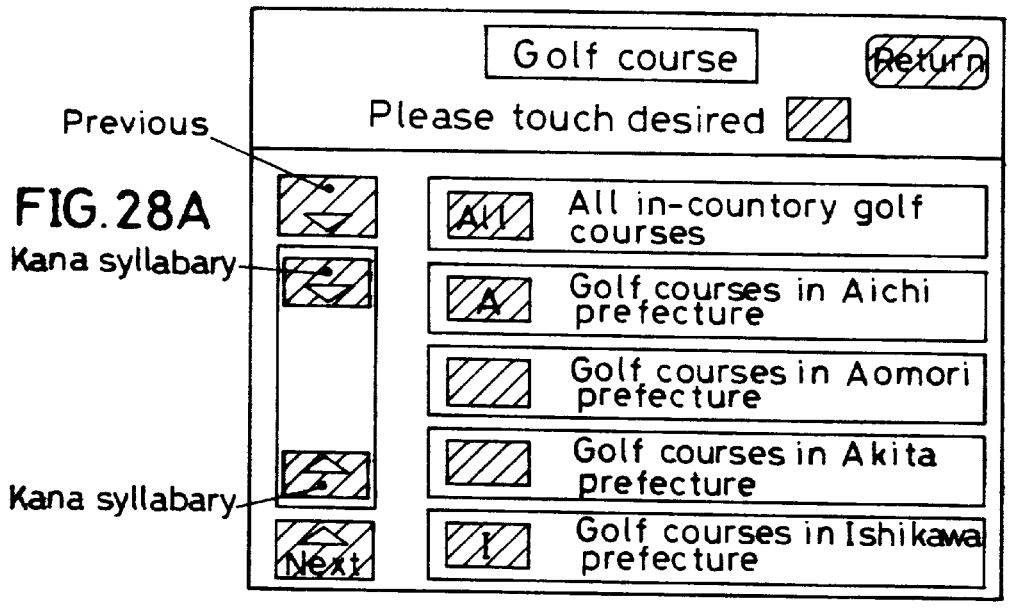
FIG. 28A
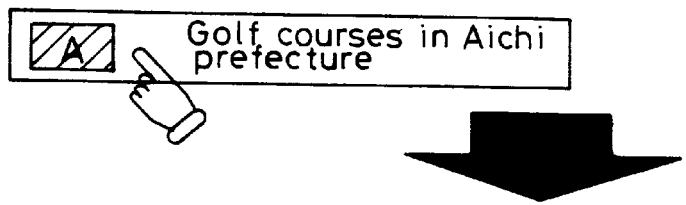
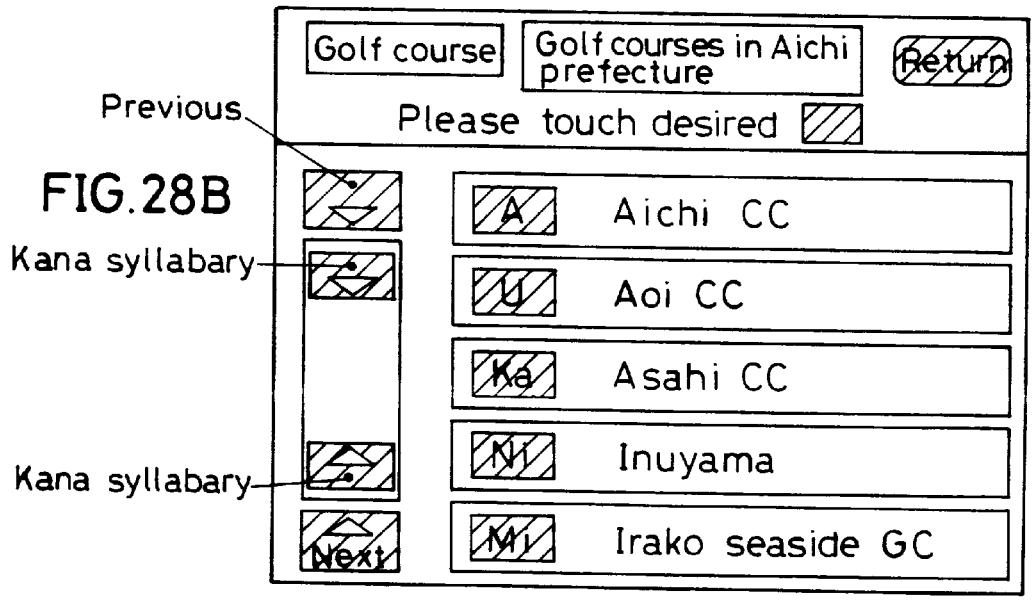
FIG. 28B
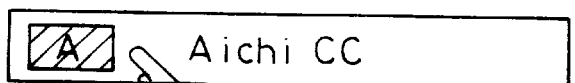

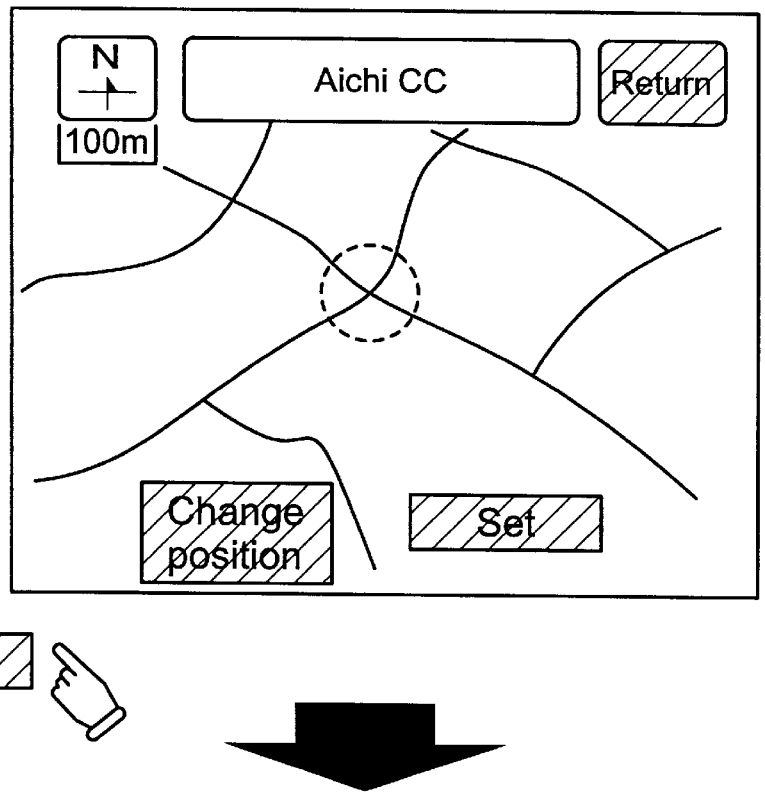
FIG. 29A
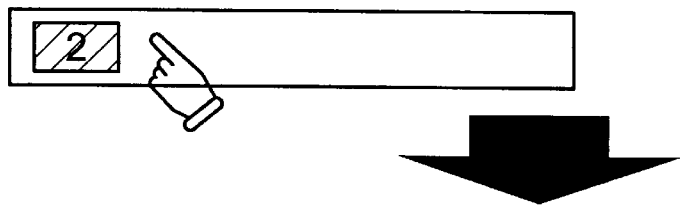
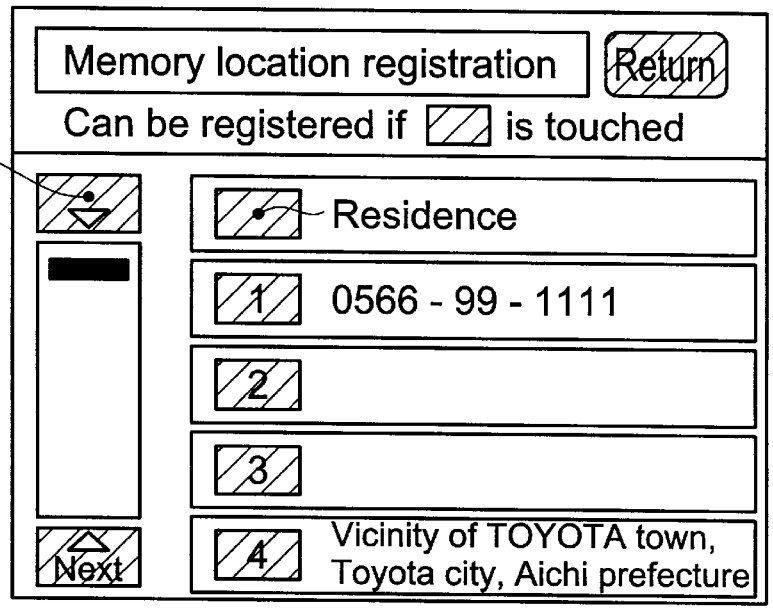
FIG. 29B

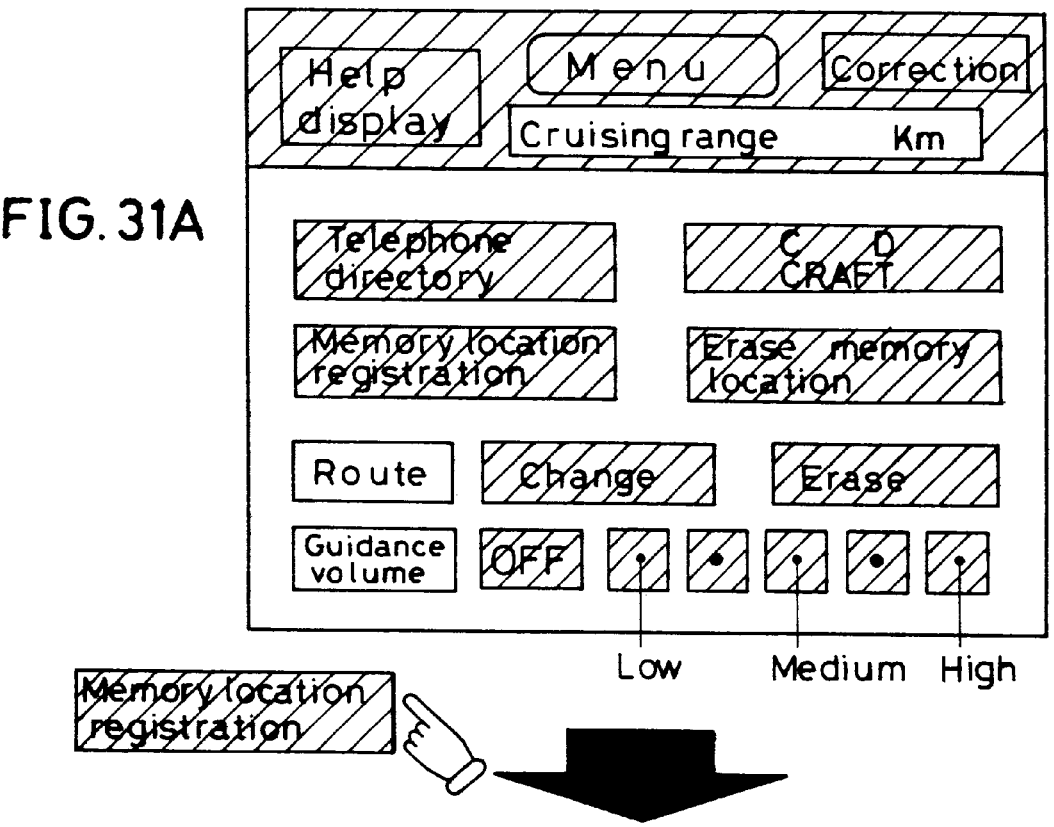
FIG. 31A
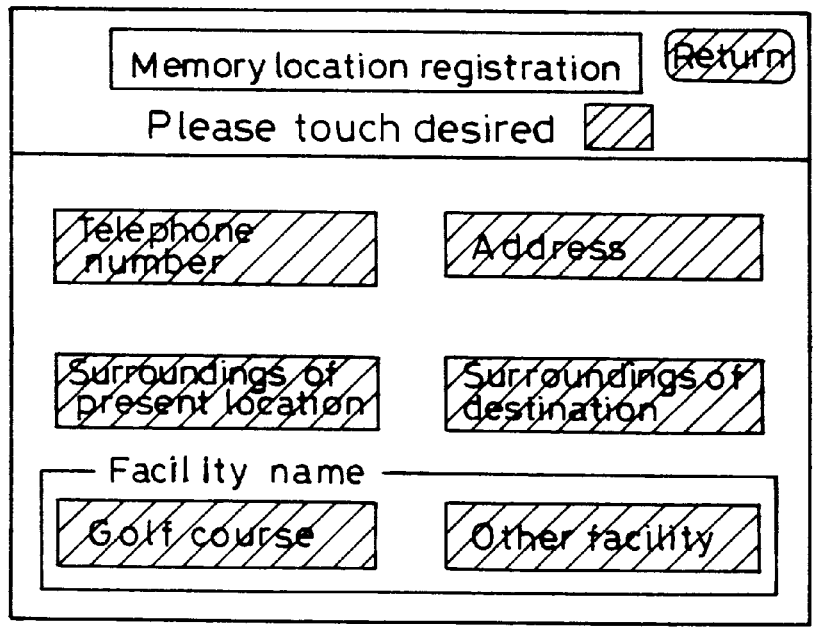
FIG. 31B
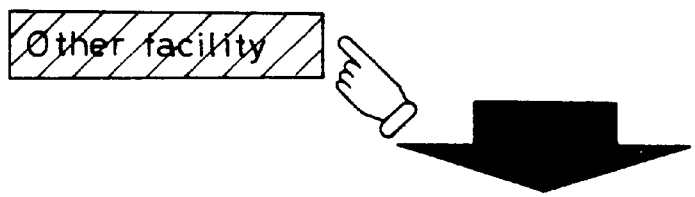

FIG. 32A
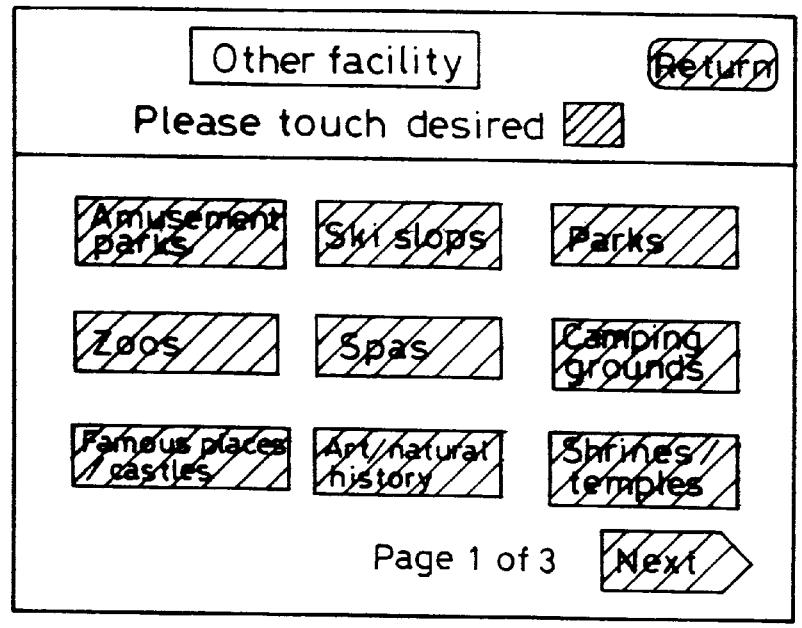
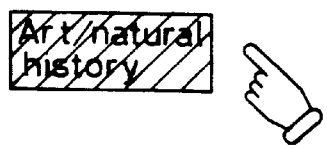 
Previous
FIG. 32B
Kana syllabary
Kana syllabary
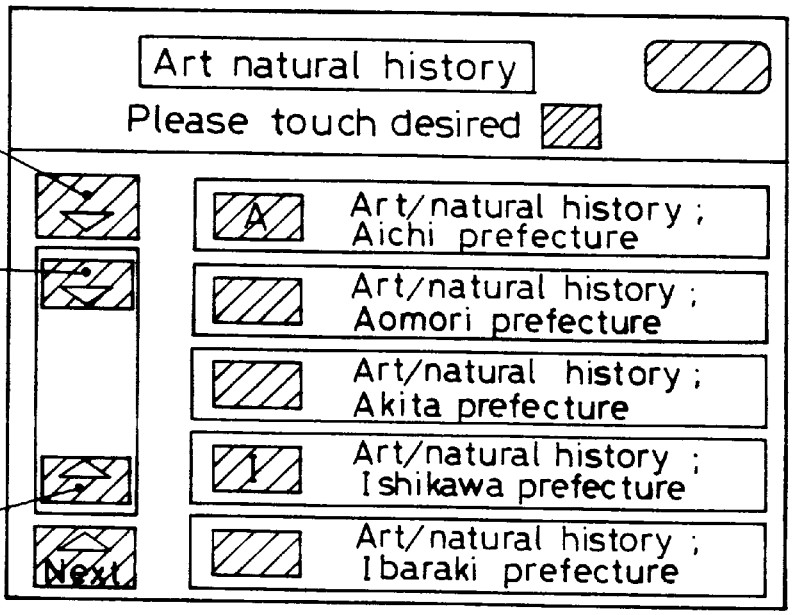
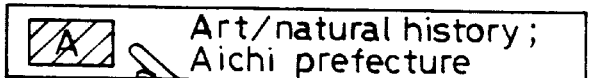

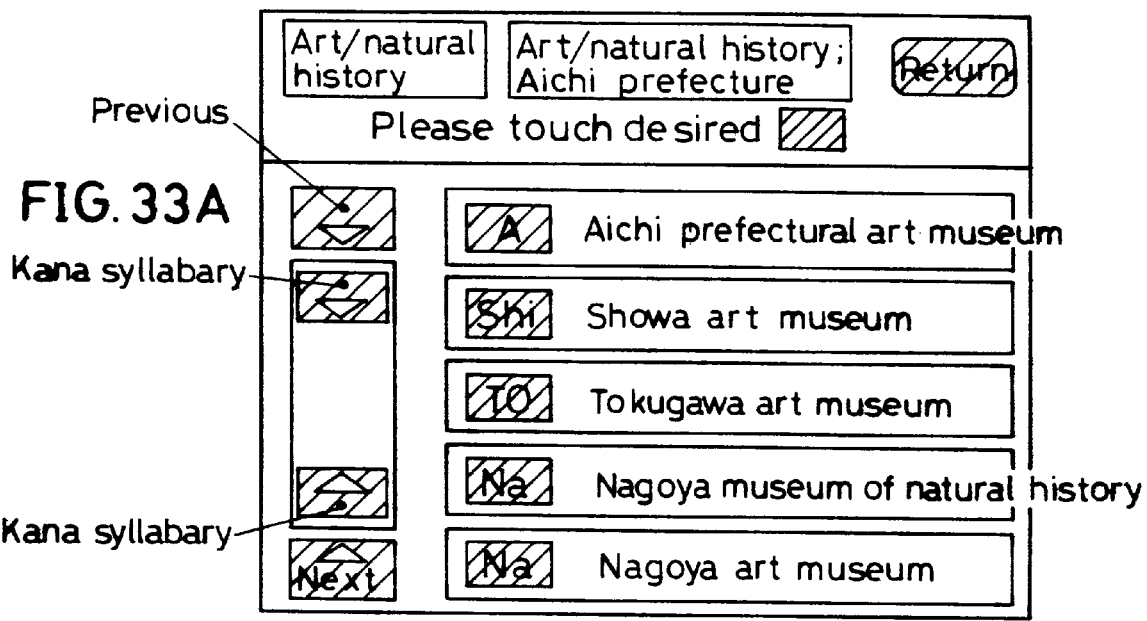
FIG. 33A
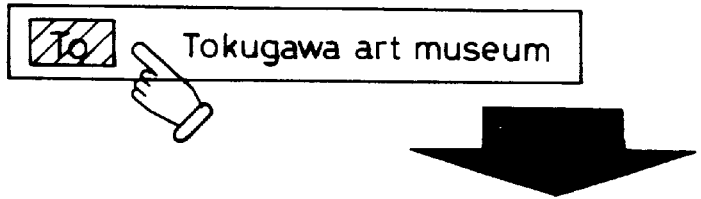
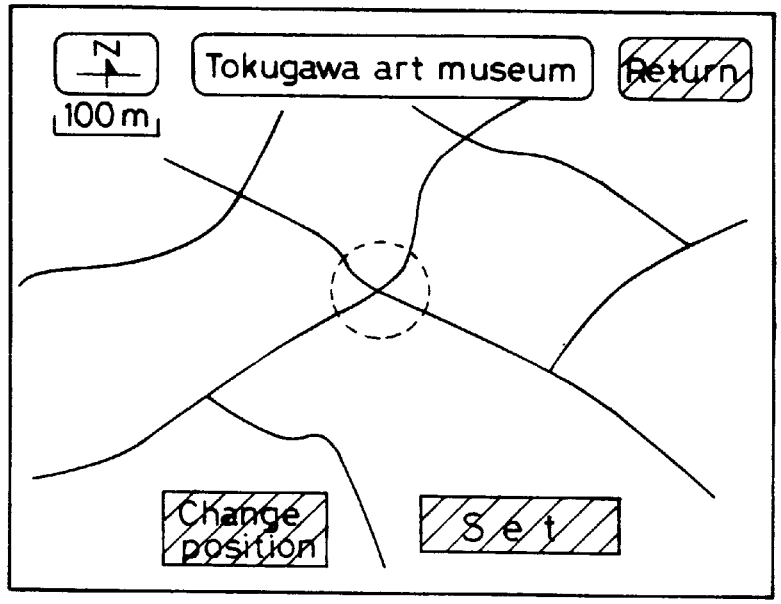
FIG. 33B
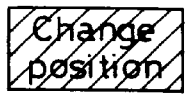

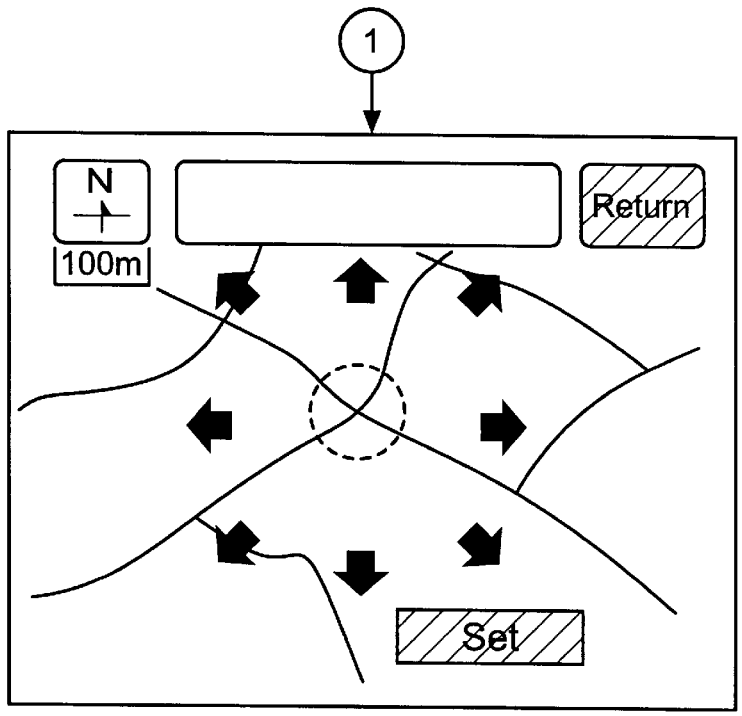
FIG. 35A
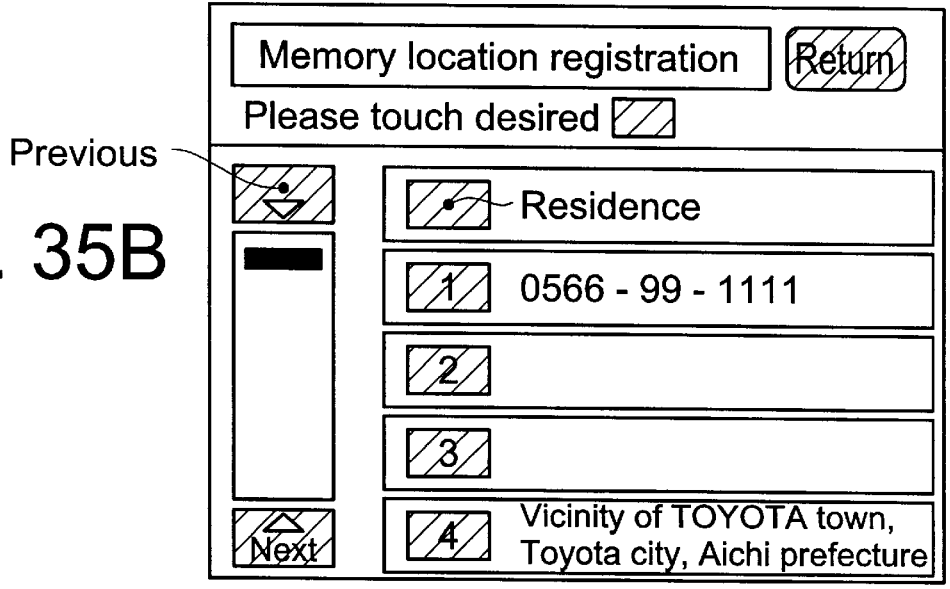
FIG. 35B
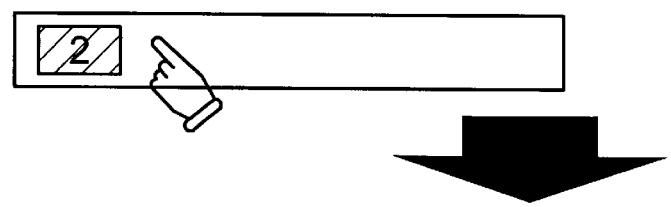

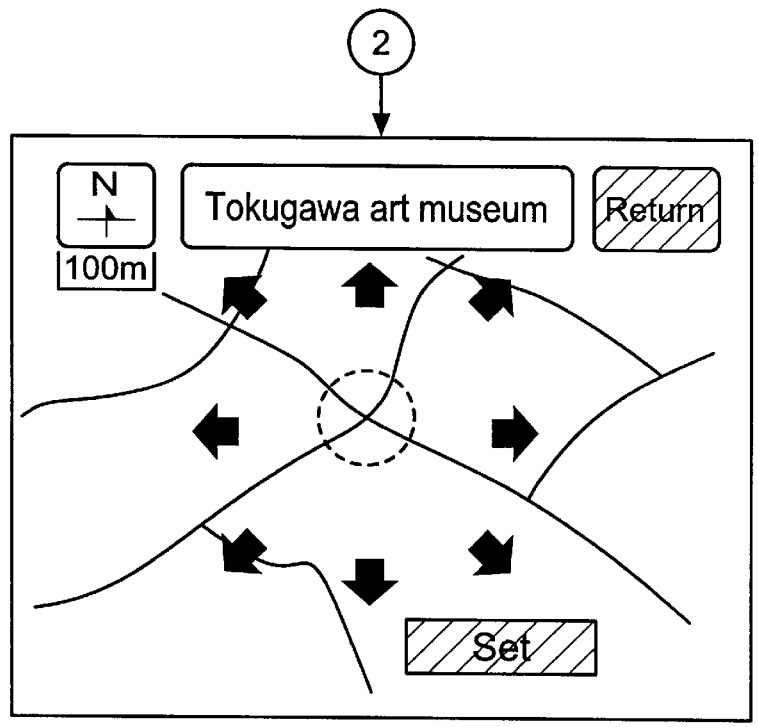
FIG. 37A
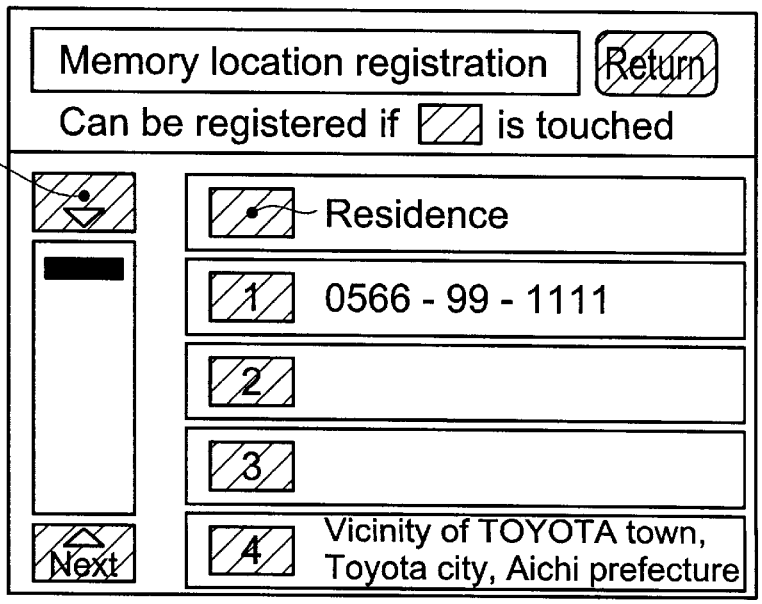
FIG. 37B
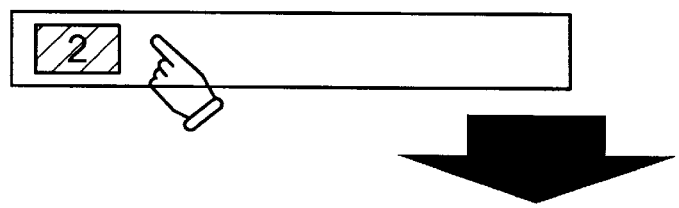

FIG. 39A
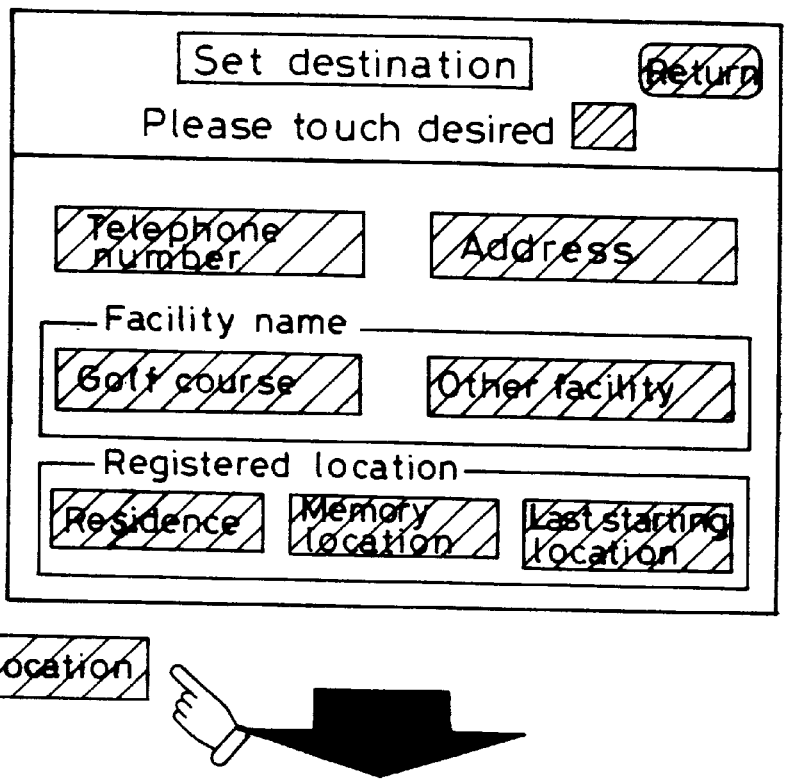
FIG. 39B
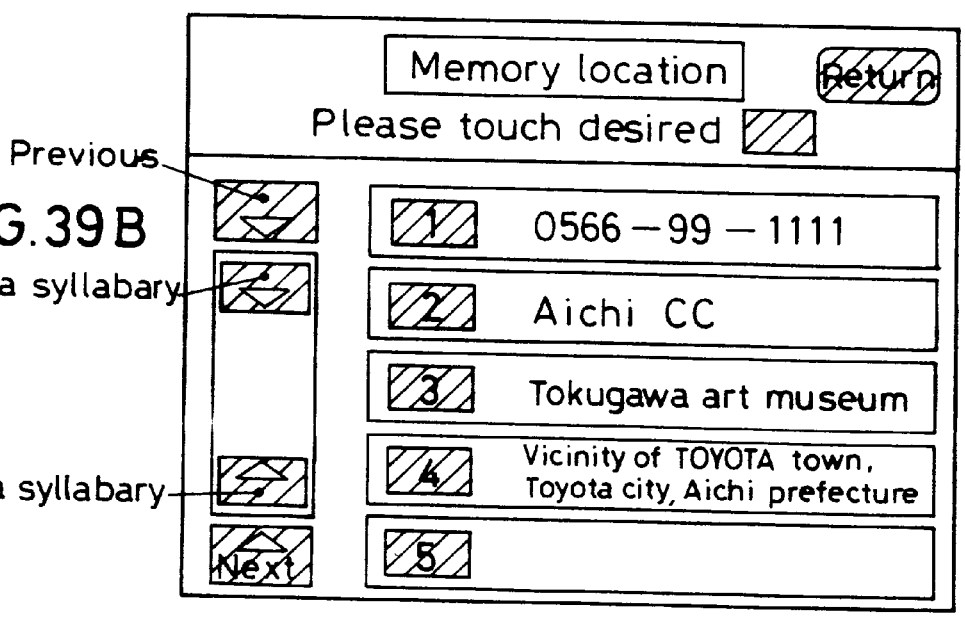
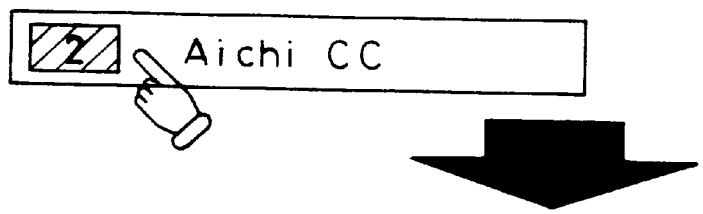

← Top line is primary position
← Move to preceding line first

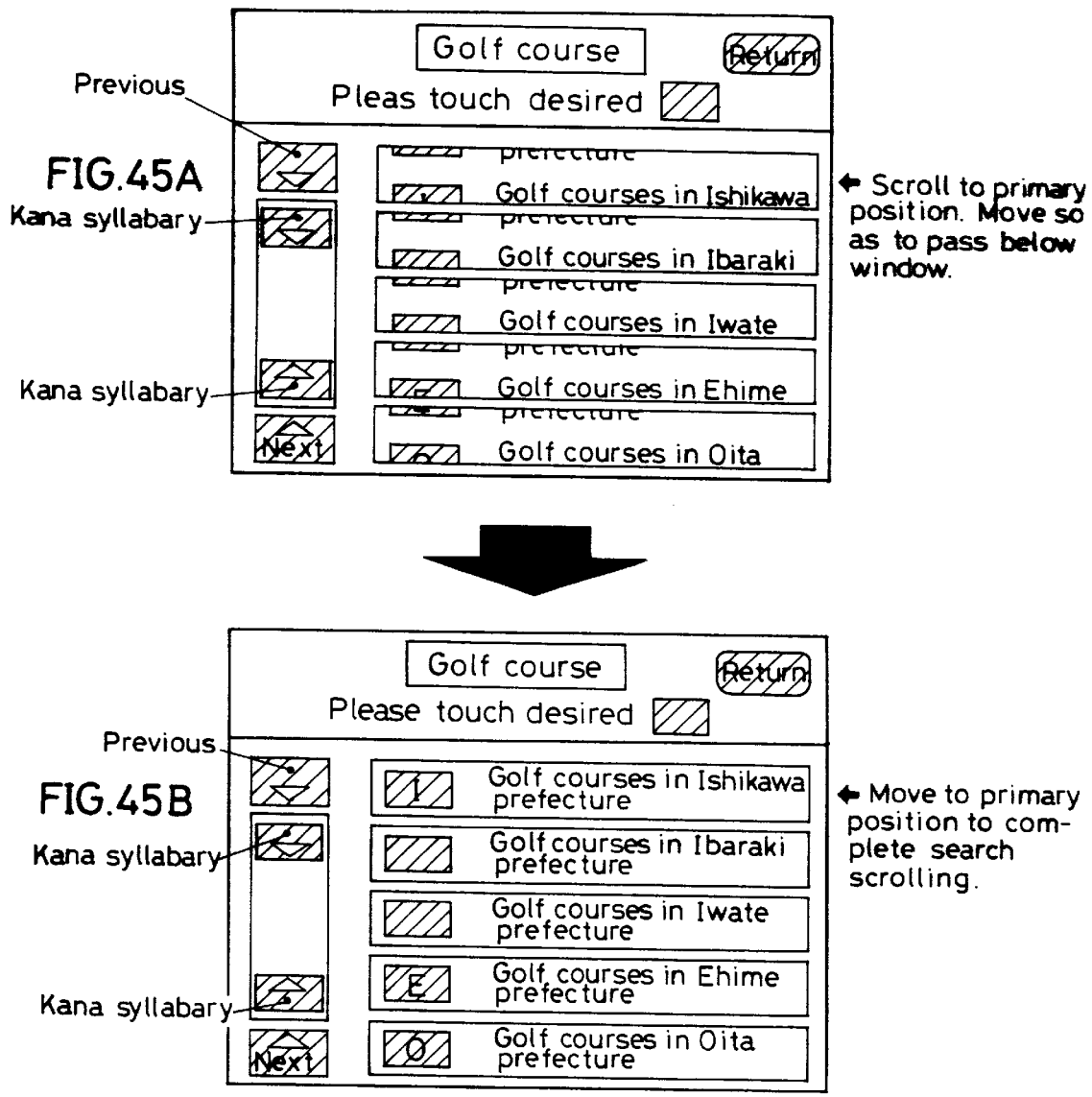

NAVIGATION SYSTEM

This application is a continuation of application Ser. No. 08/482,844, filed Jun. 7, 1995 now abandoned.

BACKGROUND OF THE INVENTION

This invention relates to a navigation system for providing route guidance by searching for a route from a present position or starting point upon input of a location such as a destination or transit point.

When any desired location is entered to set a destination or transit point in a vehicular navigation system installed in an automotive vehicle, entry by telephone number has been proposed as a form of location entry in addition to entry by code, entry by map coordinates and entry of registered location by retrieval according to genre. An example of an apparatus for entering a location by setting a destination by telephone number is disclosed in the specification of Japanese Patent Application Laid-Open No. 64-10383. According to this apparatus, a data base in which locations are stored in correlation with telephone numbers is prepared in advance. When a particular location has been retrieved, the name and address of the subscriber are displayed so that the entered location can be verified.

An example of a data base which can be used for such entry of telephone numbers is one in which telephone numbers and the names and addresses of the subscribers are registered upon being entered from a classified telephone directory. If the subscribers are retailers, statistically up to 30% of the names of the traders concerned change on an annual basis, depending upon the type of business. This means that if telephone numbers are entered when setting locations, there will be occasions where subscriber-name data corresponding to a telephone number will not always be the latest data when the subscriber name, which has been registered by its telephone number, is displayed for verification of the entered location. In such case the entered location will be different from the stored location. A problem which arises as a consequence is that the driver will not be able to tell whether the wrong location was selected because of a change in the telephone or the wrong telephone number was entered. It is required that the data be updated to the latest available data. Further, consideration has been given to increasing the verification information by simultaneously displaying the address in addition to the name of the subscriber in order to improve accuracy. When registered locations are increased in number, however, this results in too much data, which can no longer be registered in memory. This also makes updating a laborious task.

As example of a navigation system equipped with a location registration function is disclosed in the specification of Japanese Patent Application Laid-Open No. 5-131573. This apparatus is such that in a case where a location such as a destination or transit point is entered, a location once entered is registered in the system, whereby the entry operation is facilitated by enabling use of this registered location the next time.

This apparatus is such that in order to identify a registered location if the location has indeed been registered, input information is registered as the location name in a case where the registration has been designated by a designating input of character information. In a case where the registration designation has been made by selection from a displayed list without relying upon a designating input of character information, date-and-time information is registered as the location name. In a case where date-and-time information is registered as a location name, however, an inconvenience encountered is that one cannot tell which location this information belongs to when it is viewed subsequently. Though a place name desired to be registered as a location can be entered by characters according to this system, a problem of is that the characters must be entered one at a time. Thus, it is not necessarily easy to register and call locations with the conventional apparatus.

In order to solve these problems, consideration has also been given to a method of registration carried out by automatically writing in an address which includes a location registered by the system as a registered location name. However, even in a case where registration of a location is performed by selecting a the name of a facility or the like, if, say, "_ _ Golf Course" is selected and registered, the golf course is registered as the address which includes the location of the golf course and is not registered as the name of the golf course. This means that if the driver cannot remember the address that corresponds to the registered name of the golf course, a correlation cannot be made with the facility name that was registered and the driver will not know what to do.

Furthermore, in a case where a place of interest such as a tourist spot is registered, an inconvenience arises when a plurality of locations reside in the same district or at the same address. Specifically, all of the identical addresses are registered in such case.

Thus, the conventional apparatus is such that when it is attempted to simplify location input by registering a desired location in advance using a memory function, information relating to a location recognized by a variety of content comes to be registered as limited date-and-time information or address information. As a consequence, this information becomes dissociated from information which the driver recognizes as relating to the location and is difficult to comprehend. Misunderstanding and erroneous recognition tend to result.

Further, when any desired location is entered to set a destination or transit point in a vehicular navigation system installed in an automotive vehicle, the following entry methods are utilized: Specifically, the forms of entry location are entry by code, entry by map coordinates, entry of registered location by retrieval according to genre and entry by telephone number. In entry of registered location by retrieval according to genre, such as address, station, government office, intersection, airport, port, police station, parking lot or hospital, etc., first the genre is selected, whereupon the names belonging to the genre branch out successively into the structure of a tree and are displayed in accordance with each selection. The names that are the object of selection in this case are displayed over several lines in the form of a list in the order of a fixed series of characters (character string) that has been determined in advance. Selection of a name is carried out using a prescribed position in the list as a selection window.

FIG. 1 is a diagram showing an example of a display in which a list in a conventional selection window is scrolled. This illustrates a case in which registration of a location is performed by input based upon address, by way of example. When an address is selected using a place-name index screen (not shown) for location registration, first the prefecture and principal cities are displayed on the screen in the selection window in the fixed character order. For example, when Tokyo and its 23 wards have been selected, Kuroda Ward is moved to the position of the selection window and displayed. The hiragana syllables "shi", "su", "se" and "ta"

represent the first characters. The arrows on the left side are search scroll buttons and the arrows on the right side are line-feed scroll buttons. When a search scroll button is touched, the first character is moved to the top line, for example, in regular order together with the list "Shinjuku Ward", "Suginami Ward", . . . etc. When a line-feed scroll button is touched, the list is scrolled one line at a time.

In a case where scrolling is performed one line at a time in order to find a desired name on the screen thus displaying names in the selection window in the fixed character order, it is comparatively easy to set a target name in the prescribed window based upon a prediction from the continuous scrolling movement of the names. However, in a case where the list is scrolled based upon the first characters in the fixed character order, the scrolling of a target name subordinate to the first character becomes random in form. Consequently, when a target first character has entered the prescribed window, scrolling cannot be stopped at the proper timing. In other words, names subordinate to a first character may be many or few in a random manner. Accordingly, when the list is scrolled based upon the first character, there are instances where the next first character moves into the prescribed window owing to a time lag in the control system even if the scroll button is released after the target first character has entered the window. This means that it is necessary to back up by using the scroll button for the opposite direction. The result is poor operability.

Further, if such scrolling of the first characters is continuous rather than random with respect to the list of names, operability equivalent to that of scrolling one line at a time is obtained. However, scrolling to the target name would take too much time.

SUMMARY OF THE INVENTION

An object of the present invention is to reduce the memory capacity needed for telephone-number data and lighten the burden of update processing.

Another object of the present invention is to make it easy for the driver to comprehend a registered location in a case where locations are registered in advance in order to be used in location entry.

A further object of the present invention is to eliminate excessive scrolling in search scrolling.

In order to attain the foregoing objects, the present invention provides a navigation system which, as shown in FIG. 2, includes input means 1a for entering a telephone number; an information storage device 3 for storing telephone-number data 3a, in which a location name inclusive of a set of coordinate is stored for each telephone number, address data 3b in which an address is stored for each set of coordinates, and map data 3c; a central processor 4 having telephone-number retrieval means 4a for retrieving, from the information storage device 3, location coordinates and location name of a telephone number entered by the input means, and address-data retrieval means 4b for retrieving address data corresponding to the location coordinates of the telephone number entered by the input means; and display means 1b for displaying a location name and address, which have been retrieved by the central processor, as well as a map centered on the location.

The telephone-number data 3a has registered-location classification data representing classification of registered locations, and the telephone-number retrieval means 4a has discriminating means for discriminating the registered-location classification. The address-data retrieval means 4b retrieves an address name from the address data based upon results of discrimination by the discriminating means.

By virtue of these structural requisites, the present invention makes it possible to increase the information for verification and to improve data precision by displaying not only a subscriber's name but also the address at the same time even if data is not constantly updated. Further, since the amount of data is broken up into the telephone-number data 3a and address data 3b, the amount of telephone-number data 3a can be reduced. In a case where the telephone-number data 3a is changed, only the coordinates need be changed and not the address. This makes it possible to reduce the processing for making the change.

Furthermore, as illustrated in FIG. 3, the present invention provides a navigation system having a function for registering a location designated on a map, the system including input means 100 for entering a location; memory means 200 for storing location information conforming to the form of an input from the input means; control means 300 having input-form detecting means 301 for detecting the form of the input entered by the input means 100, name-data discriminating means 303 for discriminating whether a location entered by the input means has name data when the input form detected by the input-form detecting means 301 is a prescribed input form, registered-name acquisition means 304 which, when it is discriminated by the name-data discriminating means that the location entered has name data, acquires the name data, and registration means 305 for registering the name acquired by the registered-name acquisition means; and display means 400 for displaying the information registered by the control means 300.

Furthermore, as illustrated in FIG. 4, the present invention provides a navigation system having a function for registering a location designated on a map, the system including telephone-number input means 100' for entering a location; memory means 200 for storing location information; control means 300 having telephone-number discriminating means 306 for discriminating whether the entered telephone number has been registered in the memory means 200, name-data discriminating means 303 for discriminating whether a a telephone number entered by the telephone-number input means has name data, registered-name acquisition means 304 which, when it is discriminated by the name-data discriminating means that the telephone number entered has name data, acquires the name data, and registration means 305 for registering the name acquired by the registered-name acquisition means; and display means 400 for displaying the information registered by the control means 300.

By virtue of these structural requisites, the present invention is so adapted that content approximating information relating to a routinely recognized location can be made registered information. Even when registered information is used to enter a location such as a destination or transit point, comprehension is facilitated and it is possible to prevent misunderstanding and erroneous recognition.

Further, the present invention provides an information display system comprising a storage device for storing various information; a display unit for displaying various information stored in the storage device; an input unit for selectively designating a function to be executed inclusive of changing and setting of information displayed on the display unit; and control means for executing the function selectively designated by based upon operation of the input unit, wherein the input unit has movement designating means for moving information, which is displayed on the display unit, to a first prescribed position, and the control means includes first scrolling control means which, when a signal has been received from the movement designating means, is for moving information displayed on the display unit to a second prescribed position different from the first prescribed position and displaying the information at the second prescribed position, and second scrolling control means for moving the information from the second prescribed position, to which the information was moved and displayed at by the first scrolling control means, to the first prescribed position and displaying the information at the first prescribed position.

Furthermore, the storage device stores the reading of a name together with the name in each item of stored information, displays information on the display unit based upon the reading of the name or stores, as this information, information data capable of being selectively designated by the control means and data representing a display window for this control data, stores data representing the display window in a first image memory which temporarily stores image information for fixedly displaying the data on the display unit, and stores the information data in a second image memory which temporarily stores the image information capable of being selectively designated by the control means, and the control means displays the data stored in the first image memory and the data stored in the second image memory on the display unit in superimposed form.

By virtue of these structural requisites, the present invention makes it possible to readily predict movement by moving information from the second prescribed position to the first prescribed position, thereby making it possible to prevent excessive scrolling. Furthermore, the direction of scrolling is readily ascertained and the direction in which characters move at the time of scrolling is made to see.

Still other objects and advantages of the invention will in part be obvious and will in part be apparent from the specification.

The invention accordingly comprises the features of construction, combinations of elements and arrangement of parts hereinafter set forth, and the scope of the invention will be indicated in the claims.

BRIEF DESCRIPTION OF THE DRAWINGS

FIGS. 6A–6D are diagrams showing an example of the composition of a telephone-number data file;

FIGS. 12A, 12B are diagrams for describing an example of operation for registering a destination by entry of a telephone number;

FIGS. 14A, 14B are diagrams for describing an example of operation for registering a destination by entry of a telephone number;

FIG. 15 is a diagram showing another example of the composition of a telephone-number data file;

FIGS. 20A, 20B are diagrams for describing an example of operation for registering a location by entry of a telephone number;

FIGS. 22A, 22B are diagrams for describing an example of operation for registering a location by entry of an address;

FIGS. 23A, 23B are diagrams for describing an example of operation for registering a location by entry of an address;

FIGS. 24A, 24B are diagrams for describing an example of operation for registering a location by entry of an address;

FIGS. 25A, 25B are diagrams for describing an example of operation for registering a location by entry of an address;

FIG. 26 is a diagramsfor describing an example of operation for registering a location by entry of an address;

FIGS. 27A, 27B are diagrams for describing an example of operation for registering a location by entry of facility name;

FIGS. 28A, 28B are diagrams for describing an example of operation for registering a location by entry of facility name;

FIGS. 29A, 29B are diagrams for describing an example of operation for registering a location by entry of facility name;

FIGS. 31A, 31B are diagrams for describing an example of a case in which a cursor is moved in excess of a predetermined distance when a location is registered;

FIGS. 32A, 32B are diagrams for describing an example of a case in which a cursor is moved in excess of a predetermined distance when a location is registered;

FIGS. 33A, 33B are diagrams for describing an example of a case in which a cursor is moved in excess of a predetermined distance when a location is registered;

FIGS. 35A, 35B are diagrams for describing an example of a case in which a cursor is moved in excess of a predetermined distance when a location is registered;

FIGS. 37A, 37B are diagrams for describing an example of a case in which a cursor is moved in excess of a predetermined distance when a location is registered;

FIGS. 39A, 39B are diagrams for describing an example of a case in which a location that has been registered in the system is selected when a destination or transit point is set;

FIGS. 45A, 45B are diagrams for describing an example of a change in a search display.

DESCRIPTION OF THE PREFERRED EMBODIMENT

Figure 1:
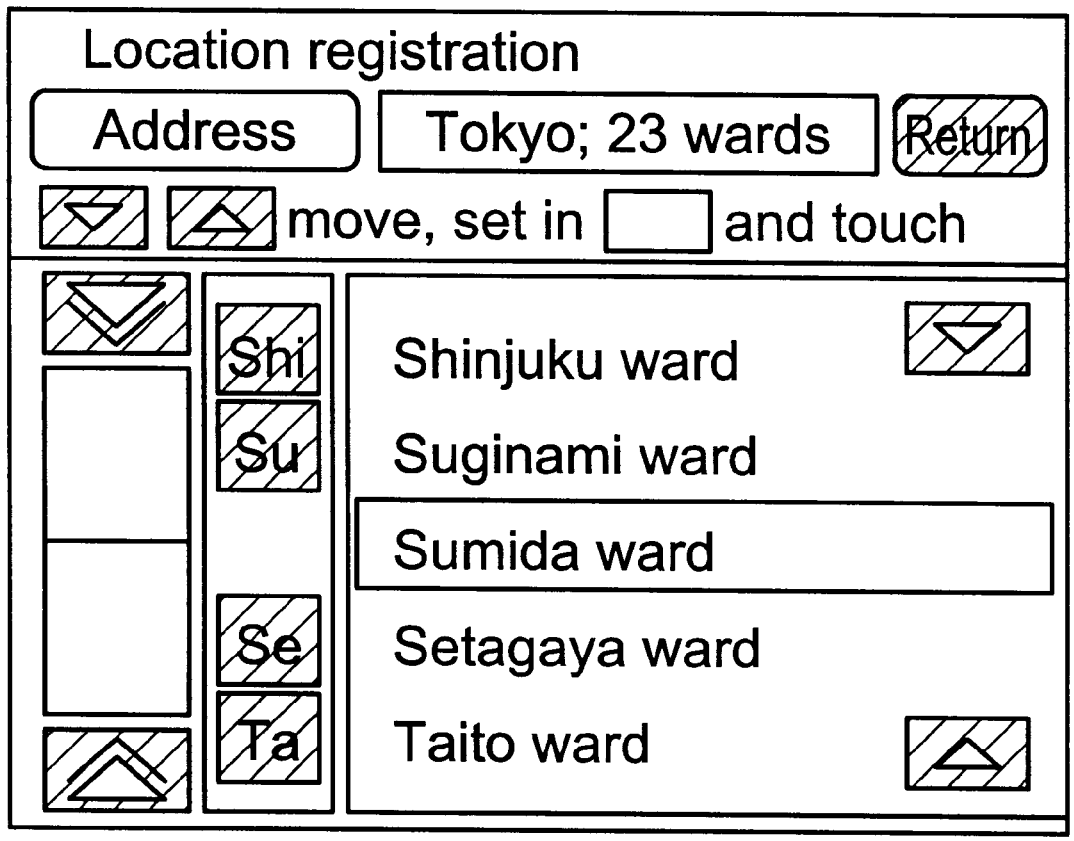
FIG. 1 is a diagram showing an example of a display in which a list in a selection window is scrolled according to the prior art.
Figure 2:
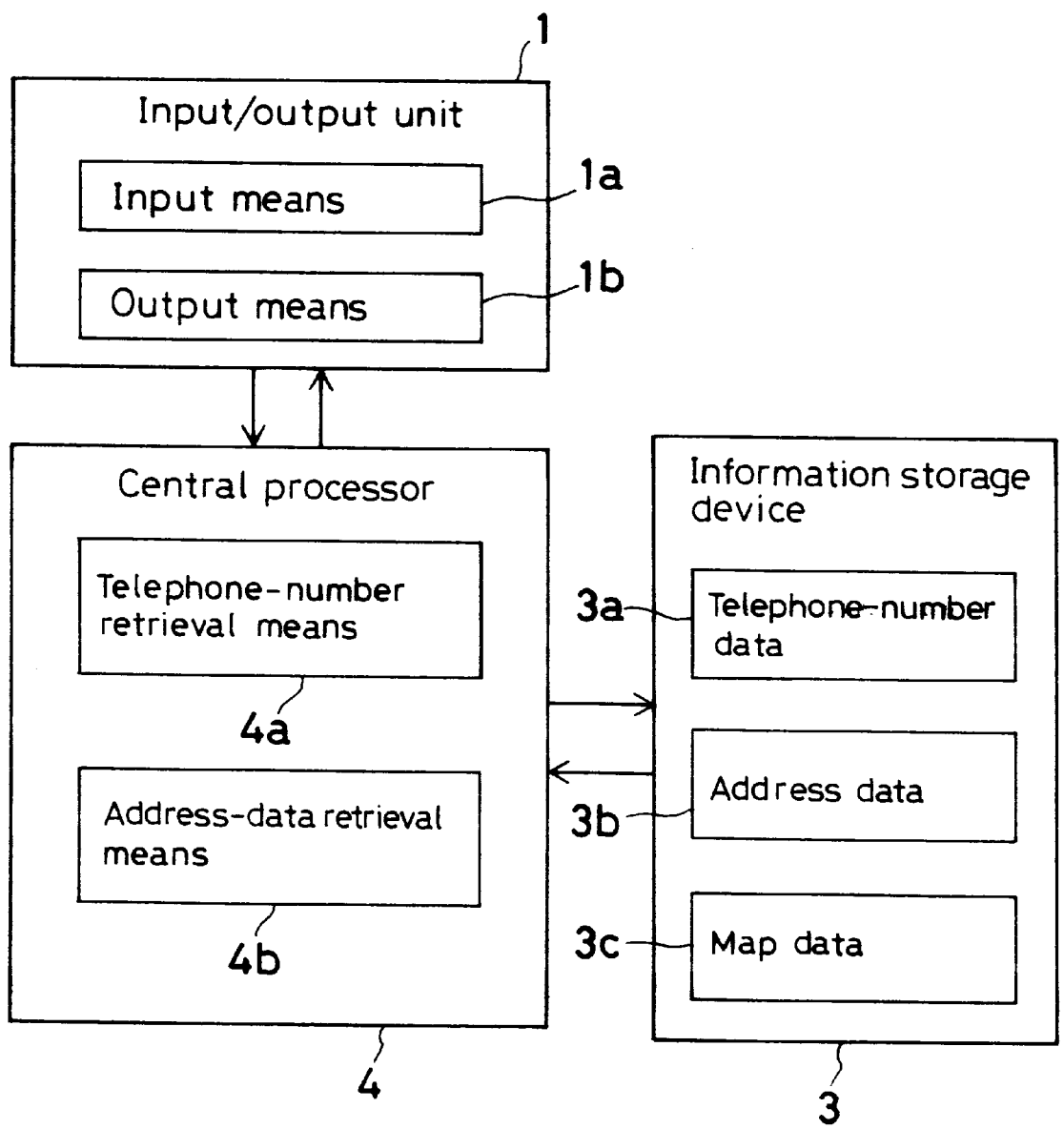
FIG. 2 is a diagram showing an example of the basic construction of a navigation system according to the present invention.
Figure 3:
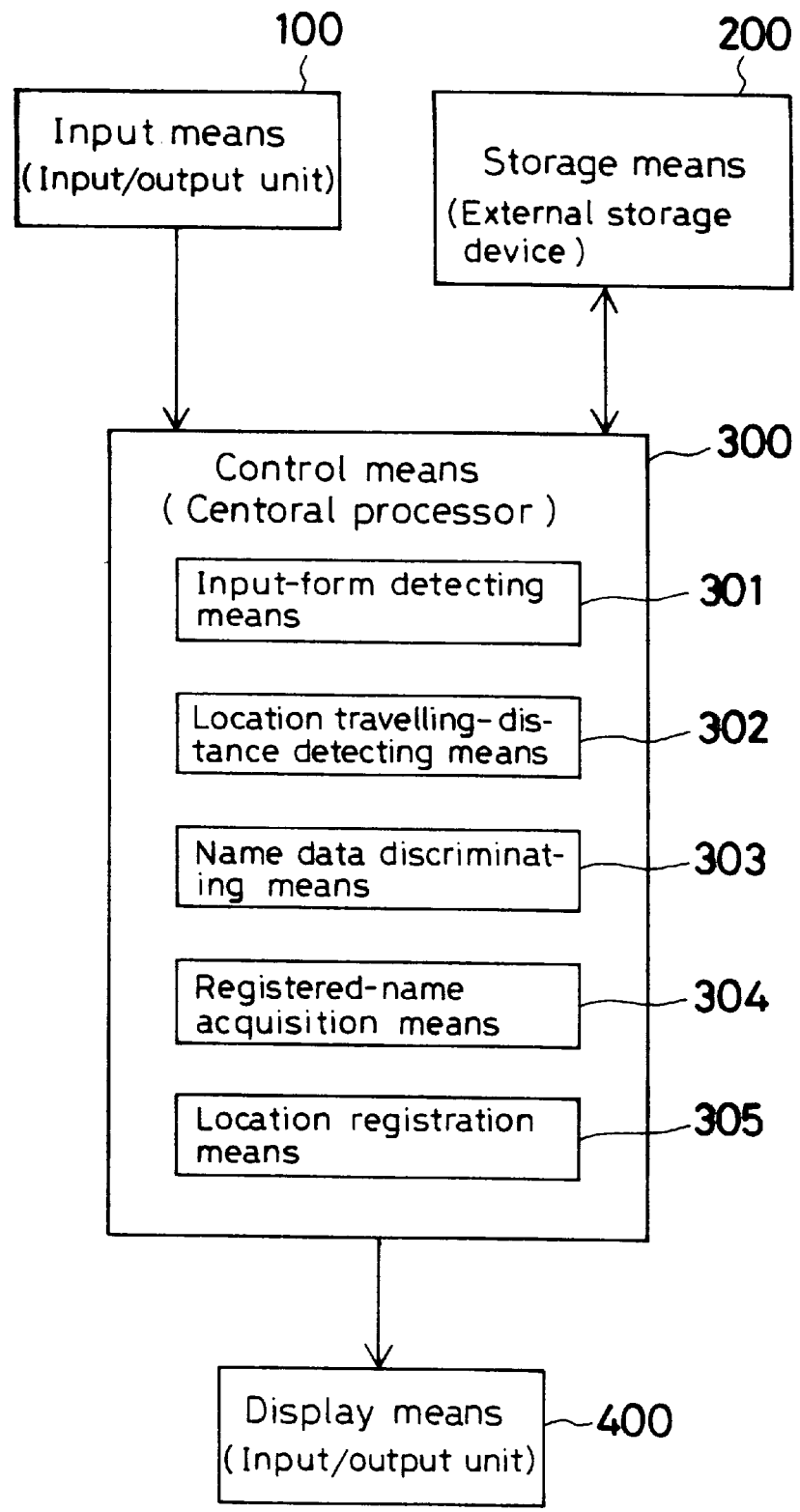
FIG. 3 is a diagram showing an example of another basic construction of a navigation system according to the present invention.
Figure 4:
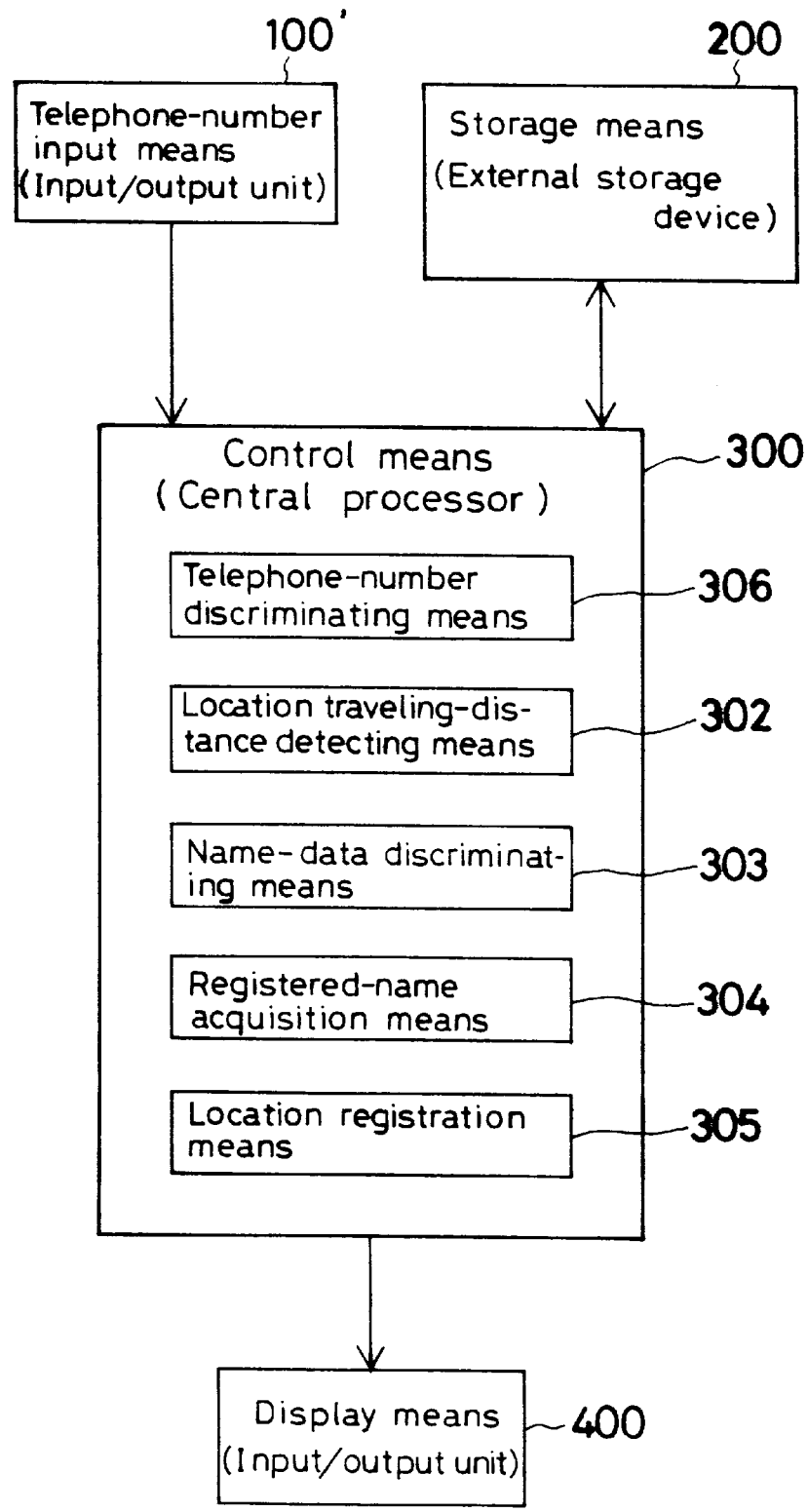
FIG. 4 is a diagram showing an example of another basic construction of a navigation system according to the present invention.
Figure 5:
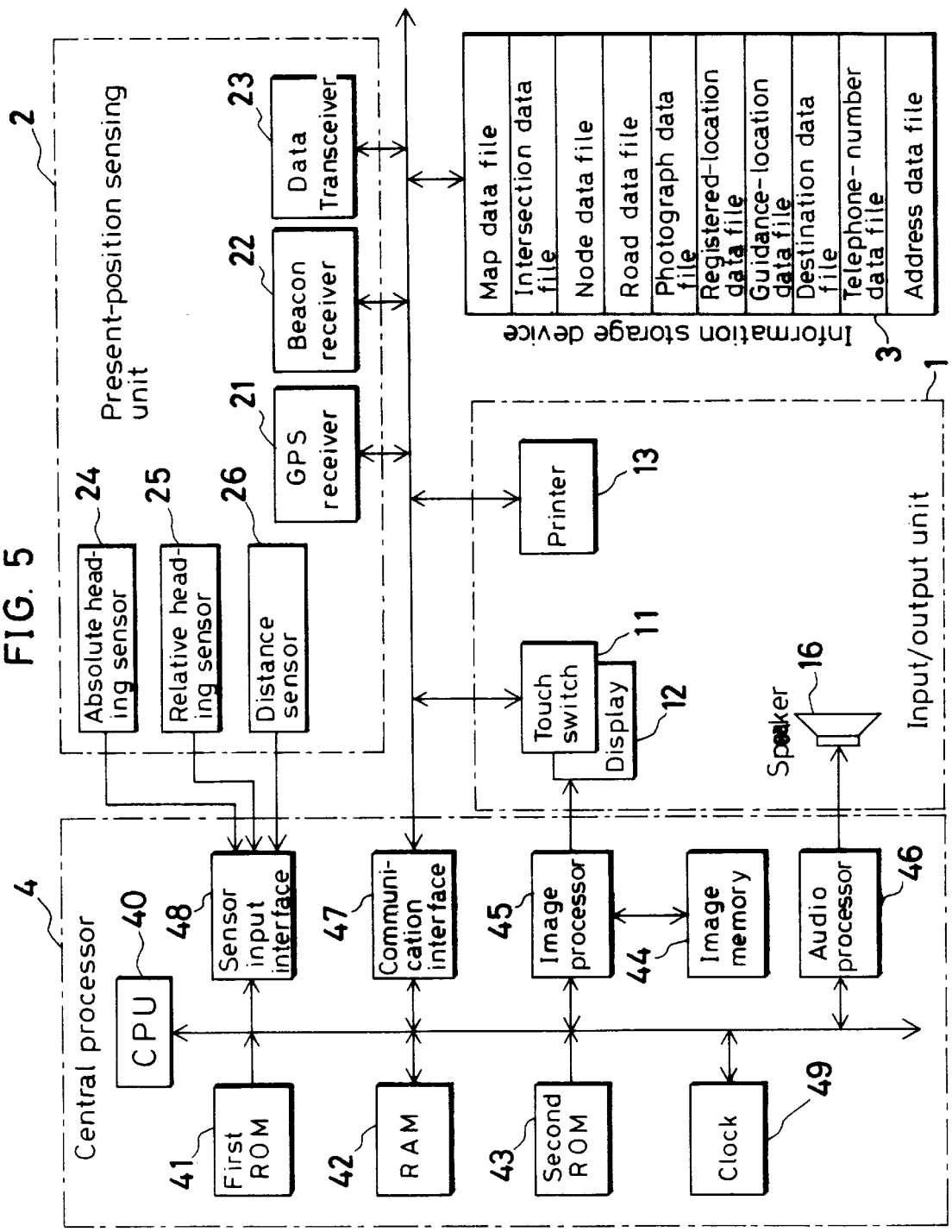
FIG. 5 is a block diagram illustrating an embodiment of a navigation system according to the present invention.

As shown in FIG. 5, a navigation system according to the present invention comprises an input/output unit 1 for input/output of data relating to route guidance, a present-position sensing unit 2 for sensing information relating to the present position of an automotive vehicle, an information storage device 3 in which navigation data necessary for route calculation and display guidance data necessary for instructional guidance have been recorded, and a central processor 4 for executing route finding processing, display guidance processing necessary for route guidance, and control of the overall system.

The input/output unit 1 functions to enter destinations, to allow the driver to instruct the central processor 4 to execute navigation processing in such a manner that guidance information can be outputted by voice and/or a screen display when required by the driver, and to print out data after processing. As means for implementing these functions, the input section of the input/output is provided with a touch switch 11 and operating switches for entering destination in the form of a telephone number or map coordinates, for requesting route guidance and for setting and changing information, such as by designating scrolling. The output section has a display 12 for displaying input data on a screen and, moreover, for automatically displaying route guidance on the screen in response to a request from the driver, a printer 13 for printing out data processing by the central processor 4 and data stored in the information storage device, and a speaker 16 for outputting route guidance by voice.

The display 12 is constituted by a color CRT or color liquid-crystal display device. On the basis of map data and guidance data processing by the central processor 4 the display 12 outputs, as a color display, all screens necessary for navigation, such as route setting screen, a screen of an interval view and a screen of intersections. The display 12 also displays buttons for setting course guidance and for changing over guidance and screens during the route instruction. In particular, transit-intersection information such as the names of intersections to be traversed are displayed in color in the form of a pop-up menu on the interval view.

The display 12 on the display unit is provided inside the instrument panel in the vicinity of the driver's seat. Observing an interval view enables the driver to ascertain the present location of the vehicle and to obtain information regarding a route from this location. The display 12 is provided with the touch panel 11 that corresponds to the display of function buttons. The arrangement is such that the operations described above are executed based upon signals entered by touching the function buttons. Input signal generating means constituted by the buttons and touch switches constructs the input section but the details thereof are not described here.

The present-position sensing unit 2 has a GPS receiver 21 which utilizes a global positioning system (GPS), a beacon receiver 22, a data transceiver 23 for receiving a GPS correction signal utilizing a cellular phone or FM multiplex signal, an absolute heading sensor 24 constituted by a geomagnetic sensor or the like, a relative heading sensor 25 constituted by a wheel sensor, steering sensor or gyro, etc., and a distance sensor 26 for sensing traveling distance from the number of revolutions of a wheel.

The information storage device 3 is a data base in which all data necessary for the navigation system is recorded, the data comprising files required for course guidance, such as files of map data, intersection data, node data, road data, photographic data, registered-location data, guidance-location data, destination data, telephone-number data and address data, etc.

The central processor 4 comprises a CPU 40 for executing various types of processing; a first ROM 41 in which are stored a program for executing processing such as route finding, a program for control of display output needed in route guidance and for control of audio output needed in voice guidance, and data required by these programs; a RAM 42 for temporarily storing the position coordinates of a set destination, retrieved route guidance information such as the code number of a road, and data which is in the course of being processed; an image memory 44 in which image data used to display a screen on the display unit is stored; an image processor 45 which, on the basis of a display-output control signal from the CPU 40, extracts image data from the image memory 44 and delivers the data to the display upon subjecting it to image processing; a audio processor 46 which, on the basis of an audio-output control signal from the CPU, combines audio, phrases, single sentences and sounds read out of the information storage device 3, converts the result to an analog signal and delivers the analog signal to the speaker 16; a communication interface 47 for performing an exchange of input/output data by communication; a sensor-input interface 48 for accepting a sensor signal from the present-position sensor 2; and a clock 49 for entering data and time into internal dialog information. Route guidance is performed in the form of a screen display and audio output. The arrangement is such that the driver can select whether the audio output is produced or not.

Figures 7, 8A, 8B:
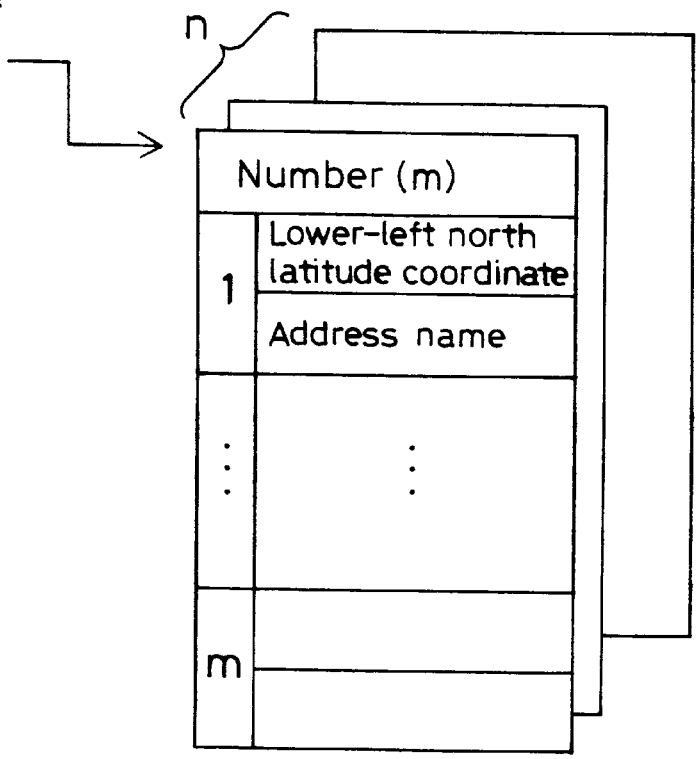
FIG. 7 is a diagram showing an example of the composition of a registered-location data file.
FIGS. 8A, 8B are diagrams showing an example of the composition of an address data file.

As shown in FIGS. 6A–6D, the telephone-number data file stored in the information storage device 3 in the navigation system of the present invention comprises telephone-number data, a registered telephone number, landmark data and location data. The telephone-number data points to the registered telephone number and to the landmark data, and the landmark data points to the location data. The telephone number data possesses such data as a toll number and local office number, east longitude and north latitude of representative location, map display scale, address and size of registered telephone number, and address and size of landmark data. It is so arranged that registered telephone numbers can be retrieved from a toll number or local office number and so that location data can be retrieved for each genre name. A registered telephone number possesses data such as the subscriber's number, subscriber's name, east longitude and north latitude of location, map display scale and registered location number. Landmark data includes such data as genre name as well as the address and size of location data. Location data includes such data as location data name and its reading, east longitude and north latitude of location, map display scale and registered location number (destination number). As shown in FIG. 7, registered-location number data includes information serving as a registered location classification and indicating whether the data is a generally registered location or from a classified telephone directory, as well as a number within the classification. As shown in FIGS. 8A and 8B, address data includes a lower-left east longitude coordinate and a north-latitude data address in the form of a mesh of predetermined distances, and a lower-left north latitude coordinate and address name of a point ahead. The data is so arranged that the name of an address can be retrieved from coordinate of east longitude and north latitude.

Accordingly, when a telephone number is entered, a subscriber's number which coincides with the registered telephone number is searched from the toll number or local office number of the telephone-number data. If the subscriber's number is retrieved, then the name of the subscriber is acquired. If the subscriber's number is not retrieved, genre names are displayed from the landmark data and the location data name of a genre name designated from among these genre names is displayed. At this time the location data name is displayed in the order of a fixed character string based upon the reading of the location data in such a manner that the location data name will be ease to retrieve, and a search operation is also performed by the scroll button. When the subscriber's name and the location data name are displayed, the address name also is acquired and displayed simultaneously by the address data based upon the coordinates of east longitude and north latitude. In a case where the subscriber's number is retrieved or the subscriber's number fails to be retrieved and a location by genre is selected in the manner set forth, a map of the surroundings centered on the location is displayed based upon the east longitude and north latitude of the location and the scale of the map display. However, in a case where the desired location has not been registered even as a location classified by genre, a map of the surroundings is displayed centered on a representative location set in advance by a toll number or local office number based upon the east longitude and north latitude of the representative location and the map display scale in the telephone-number data. The desired location is entered in the form of coordinates from the map while the map is being scrolled.

Operation will be described next.

Figure 9:
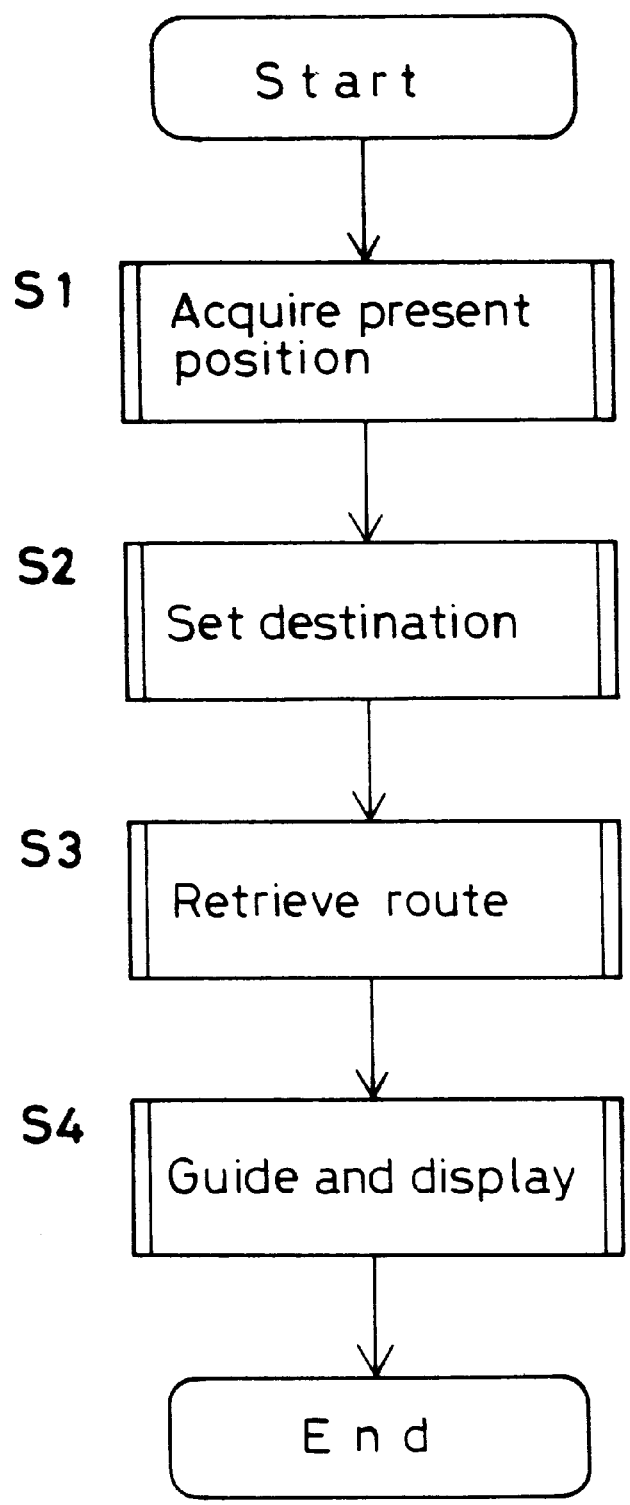
FIG. 9 is a flowchart for describing the overall flow of the navigation system according to the present invention.

When the program of the route guidance system is started by the CPU 51 of the central processor 4, first the present position is sensed by the present-position sensing unit 2, a map of surroundings centered on the present position is displayed and the name of the present position is displayed (step S1), as shown in FIG. 9. Next, the destination is set (step S2) using a telephone number and an address, facility name and registered location, etc., after which a route from the present position to the destination is found (step S3). When the route has been decided, route guidance and display are performed repeatedly (step S4), until the destination is reached, while the present position is followed up by the present-position sensing unit 2. In a case where a detour setting has been entered before the destination is reached, a search area is set, a search is performed again within this area and route guidance is performed repeatedly in similar fashion until the destination is reached.

The present invention is such that in a case where the setting of a destination in the above-mentioned flow is carried out by a telephone number, the subscriber's name or the location name is acquired in the form of telephone-number data from the telephone number, the address name is acquired in the form of address data from these coordinates (east longitude and north latitude), and the subscriber's name or location name is displayed together with the address name. Thereafter, the map of the surroundings centered on this location is displayed, whereby the driver is capable of performing verification to determine whether the location entered by the telephone number is erroneous or not.

Processing for setting a destination by a telephone number will now be described.

Figure 10:
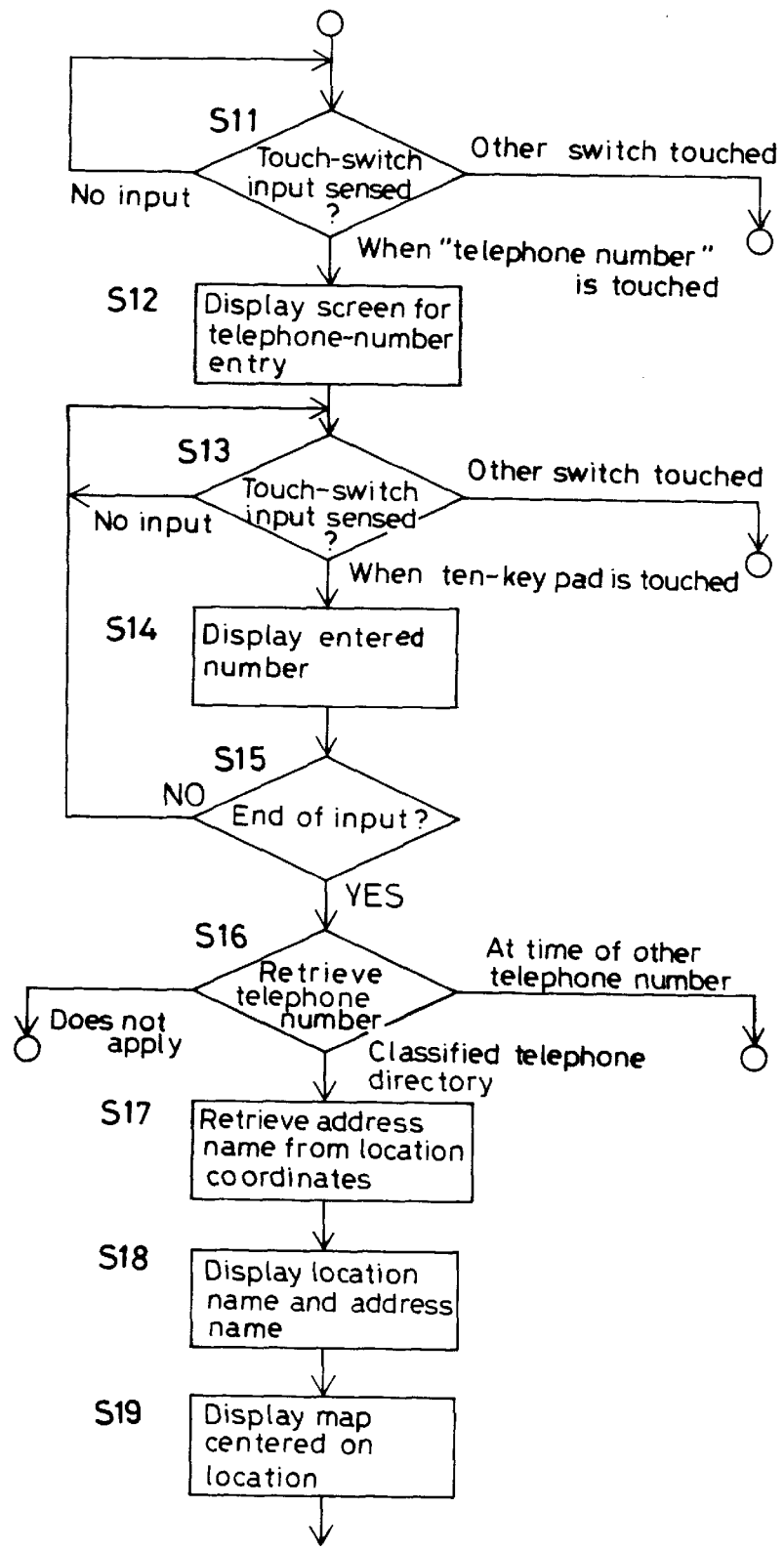
FIG. 10 is a diagram for describing a flow for setting destination by a telephone number.

In the setting of a destination, the system waits for detection of an input from the touch switch, as shown in FIG. 10. It is determined whether a telephone number button has been touched on the screen for setting a destination (step S11). If the telephone number button has been touched, then the display is switched over to a screen for entering a telephone number (step S12). The system then waits for detection of a further touch-switch input and determines whether a button on a ten-key pad has been touched (step S13). If a button on the ten-key pad has been touched, then the entered number is displayed (step S14). This operation is repeated (step S15) until the toll number or local office number as well as the subscriber's number are entered. When entry of the telephone number is finished, the telephone-number data is accessed and the subscriber number of the registered telephone number that has been entered is retrieved from the classified telephone directory (step S16). In a case where "Classified Telephone Directory" is discriminated as being the registered location classification shown in FIG. 7, the address name of the address data is retrieved from the location coordinates (step S17) and the subscriber name and address name of the registered telephone number are displayed (step S18), after which a map of the surroundings centered on this location is displayed (step S19). By thus displaying the map following the display of the subscriber name and address name, the location is verified. Then, when a setting button is touched, the setting of the destination ends.

The flow of operation will now be described while giving an illustration of the composition of a screen.

Figure 11:
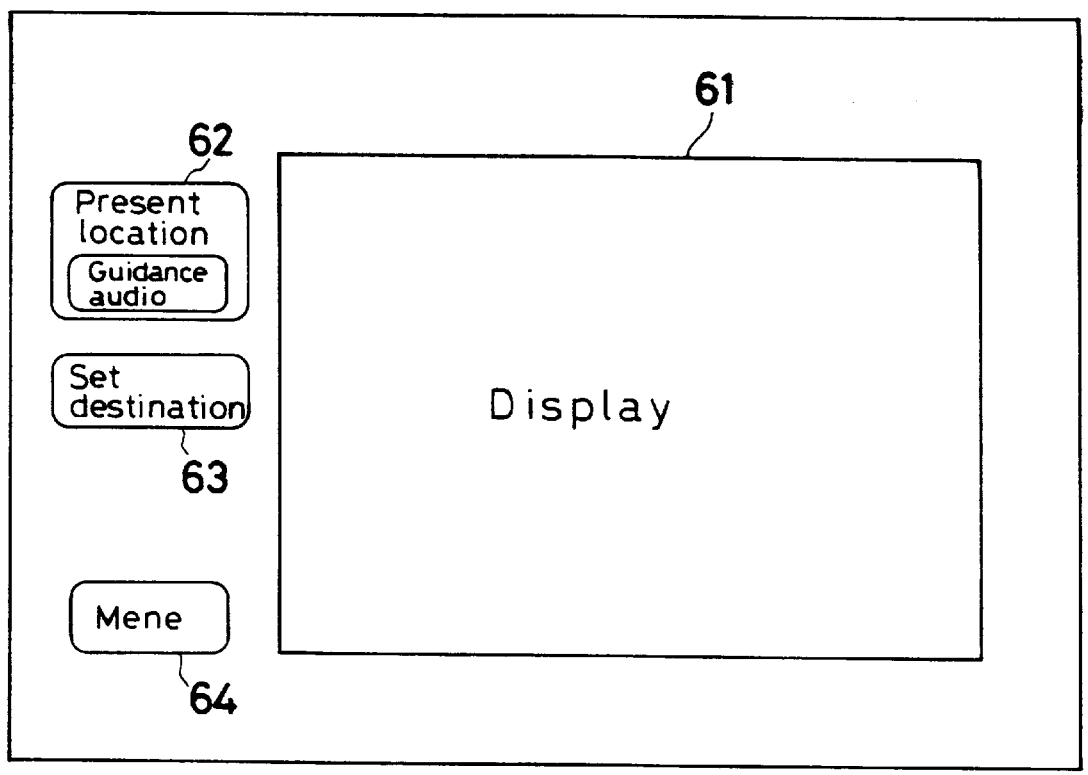
FIG. 11 is a diagram showing an example of the overall composition of a control panel and display unit.

In FIG. 11, a display 61 is constituted by a color CRT or color liquid-crystal display device. A touch panel is combined with the screen and the display is provided inside the instrument panel in the vicinity of the driver's seat. The display presents a color display of all screens necessary for navigation, such as a screen of present location and guidance, a screen for setting destination and a menu screen, which are based upon map data and guidance data processed by the central processor. Buttons for designating operations are displayed, and a touch panel is provided on the screen in order sense selection and operations of these buttons. Transit intersection information such as the names of intersections to be traversed is displayed at all times in color in the form of a pop-up menu on a screen showing an interval view.

The panel surrounding the display 61 is provided with a present-location (audio guidance) switch 62, a destination setting switch 63 and a menu switch 64. When the present-location (audio guidance) switch 62 is pressed on another display screen, the screen is switched over to the present-location display screen and a map centered on the present location sensed by the present-position sensing unit is displayed. When the menu switch is pressed further on the present-location display screen, course guidance is started and the guidance screen is outputted along with instructional audio. The present-location display screen further displays a "Details" button for switching over to a more detailed map, a "Wide Area" button for switching to a wide-area map, and a "Correction" button for correcting the present location (the center position on the map). A present-location correction screen displays move buttons in the form of arrows pointing up, down, left, right and diagonally, as well as a "Setting" button. When a move button is touched, the map is moved and the center of the map becomes the present location. Pressing the "Setting" button makes it possible to correct the present location.

When the destination setting switch 63 is pressed, the screen changes over to a destination setting screen of the kind shown in FIG. 12A. This screen makes it possible to set a destination. The designation setting screen displays selection candidates when a destination is to be selected, these candidates being buttons for "Telephone Number"; "Address"; facility name such as "Golf Course" or "Other Facilities" (stations, intersections, IC•SA•PA and other genre); and registered location such as "Residence", and "Memory Location", "Previous Departure Point". Selectively touching any of these buttons makes it possible to set a destination based upon the respective content. A screen for describing operation can be presented by a help display button.

Figure 18A:
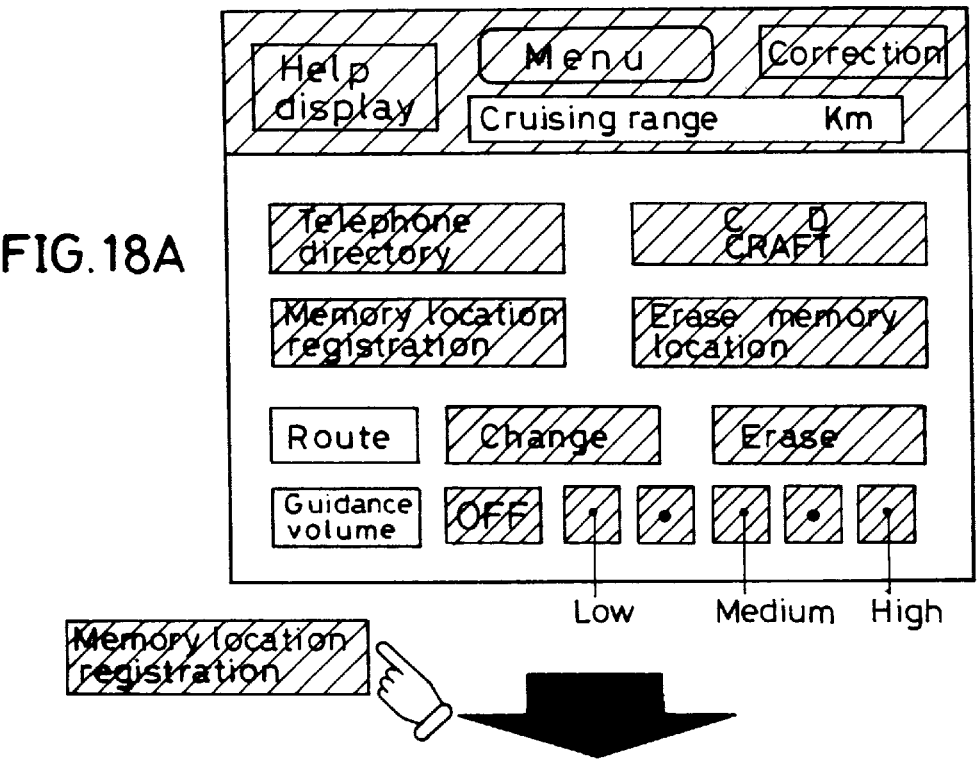
FIGS. 18A, 18B are diagrams for describing an example of operation for registering a location by entry of a telephone number.
Figure 18B:
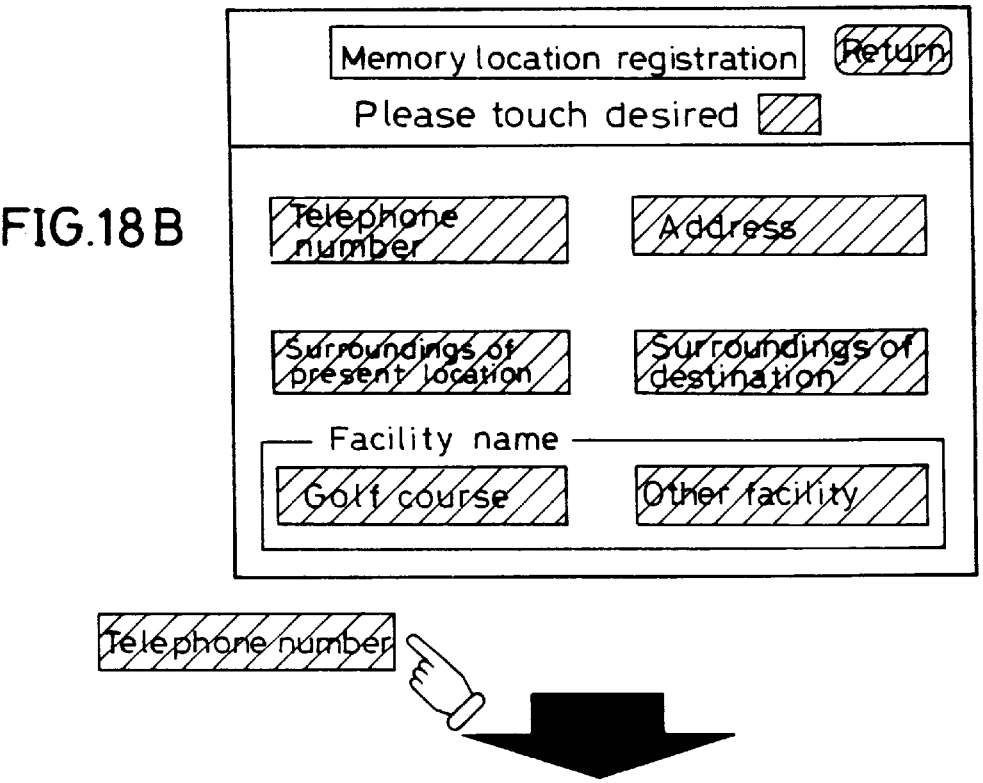

When the menu switch 64 is pressed, the screen is switched over to a menu screen of the kind shown in FIG. 18A. Here buttons are displayed for "Telephone Directory", "CD CRAFT", "Memory Location Registration", "Memory Location Erase", route "Change" and "Erase" and for adjusting sound volume. Selectively touching any of these buttons makes it possible to utilize the corresponding function. Further, distance capable of being traveled as calculated based upon remaining amount of gasoline and fuel consumption is displayed in an area for cruising range. "Telephone Directory" provides registered telephone numbers of facilities whose telephone numbers are frequently checked. Such destination facilities are automobile service centers, traffic information centers, tourist information centers, emergency medical information centers, restaurants and hotels. "CD CRAFT" is selected in a case where a CD-ROM is loaded and software from the CD-ROM is utilized on this display input screen. "Memory Location Registration" is for allowing the driver to independently register locations often used, such as golf courses, residences of acquaintances, various institutions and facilities. As shown in FIG. 18B, "Telephone Number", "Address", "Surroundings of Present Location", "Surroundings of Destination", "Golf Courses" and the names of various facilities such as "Other Facilities" can be used selectively and registered. "Memory Location Erase" is for erasing a location that was registered using "Memory Location Registration". Route "Change" is for changing to a route traversing a new destination, transit point or detour. "Erase" is for erasing a route already retrieved. The volume adjustment is selected when the volume of speaker 16 is to be adjusted. The "OFF" button is operated to halt audio output, and the "LOW", "MEDIUM" and "HIGH" buttons are used to decrease or increase volume. If a geomagnetic sensor or the like installed as means for sensing present position is influenced by noise, "Correction" is used to correct for this.

When a destination is to be set using a telephone number, first the destination setting screen shown in FIG. 12A is called by pressing the destination setting switch 63. Touching the "Telephone Number" button changes over the screen to the telephone-number input screen shown in FIG. 12B. The telephone-number input screen is constituted by a telephone-number input section 101, which comprises a ten-key pad for successively entering toll number, local office number and subscriber number and a clear key for clearing an entered number, and a telephone-number display field 102 for displaying the entered telephone number in a field at the upper part of the input section. When the desired telephone number is entered successively starting from the toll number, the entered telephone number is displayed in the telephone-number display field 102 in the manner illustrated in FIG. 13B. When the subscriber number is retrieved from the telephone-number data file in the manner described earlier, the address name corresponding to the coordinates of east longitude and north latitude stored in the telephone-number data file are retrieved from the address data file and a message to the effect that a map of the surroundings will be displayed is displayed, for a fixed period of time, along with the subscriber name "Hakukan, Takadake Branch" and address name "Izumi, Higashi Ward, Nagoya City", as depicted in FIG. 14A. A particular feature of this embodiment is that a retrieved-result display field 103 which displays the retrieved subscriber name and address name is displayed on top of the ten-key pad, which constructs the telephone-number input section, so as to be displayed together with the entered telephone number.

Figure 13:
FIGS. 13A, 13B are diagrams for describing an example of operation for registering a destination by entry of a telephone number.
Figure 13:

More specifically, the telephone-number input screen shown in FIG. 12B is stored in a V-RAM (image memory 44) as a base screen for use when a telephone number is entered. This telephone-number input screen is displayed on the display as a window of the base screen when entry of a telephone number is designated. By touching the numerals on the ten-key section 101 (FIG. 12B) on the input screen, the entered telephone number is displayed, in superimposed form, on the position of the telephone-number display field 102 on the telephone-number input screen, as illustrated in FIG. 13B. When the subscriber name and address of the entered telephone number are subsequently retrieved, the retrieved results are displayed in the retrieved-result display field 103 in FIG. 14A. The retrieved-result display field 103, however, is stored separately of the telephone-number input screen 101 in the V-RAM. When the retrieved results are displayed, the coordinates of the display position are decided and the window of the retrieved-result display field is displayed so as to overlap the ten-key section of the window on the telephone-number input screen. The window of the retrieved-result display field is displayed in a color, such as the color white, so as to hide the ten-key pad.

In the telephone-number input screen illustrated in, say, the specification of Japanese Patent Application Laid-Open 3-141499, the arrangement is such that the ten-key pad for telephone number input is displayed on the right side of the center of the screen and the results of input or results of retrieval are displayed on the left. However, since the display is a display for a vehicle, the size of the display is on the order of six inches at most. When the display screen is divided into right and left sections as in the prior art, the displayed information becomes very small. This means that the wrong number may be pressed when making an entry from the ten-key pad and that the display of retrieved results becomes difficult to recognize. By adopting the screen arrangement illustrated in this embodiment, first the retrieved-result display field 103 is displayed so as to conceal the ten-key pad display section 101. In a case where the telephone number has been entered correctly and the retrieved results have been extracted, operation of the ten-key pad becomes unnecessary. As a consequence, it is possible to call the user's attention to the fact that operation of the ten-key pad is no longer necessary. Owing to the fact that this system is for use in vehicles, it is required that the displayed information be presented in large form as close to the center of the display as possible because the display is small. By adopting the arrangement of this embodiment, however, the display of the telephone-number input field and of the retrieved-result display field can be made easy to recognize.

By thus simultaneously displaying the entered telephone number and the retrieved subscriber name and address name, the operator is capable of easily verifying the name and place that correspond to the entered telephone number. After the prescribed information is displayed in the retrieved-result display field for a fixed period of time, the map of the surroundings centered on the positional coordinates of the entered telephone number is displayed, as shown in FIG. 14B. It is so arranged that the retrieved subscriber name and address name are displayed in the retrieved-result display field 103 and so that the registered-location classification shown in FIG. 7 is displayed. Since the data "Classified Telephone Directory" has been stored as the registered-location classification, a display is presented reading "Retrieved from classified telephone directory." Accordingly, with regard to the entered telephone number, it is determined by the telephone-phone number retrieval means 4a, at step S16 in FIG. 10, whether the telephone number has been registered or not. If the telephone number has been registered, the registered-location classification shown in FIG. 7 is subjected to discrimination and the address name is retrieved based upon the results of discrimination. A particular feature of this embodiment is that two types of data, namely "Generally Registered Location" and "Classified Telephone Directory", have been stored as the registered-location classification data. Accordingly, if "Generally Registered Location" has been retrieved, the name is retrieved from the telephone-number data and only the name is displayed. In case of "Classified Telephone Directory", not only the name but also address data corresponding to the entered location coordinates are retrieved and the address is displayed together with the name. Further, according to the present invention, an address need not be displayed with regard to a location name that is difficult to understand among the locations registered in the classified telephone directory, examples being a public facility such as a government office or post office, a hotel or a station, etc. Such an address may be removed from the registered locations of the "Classified Telephone Directory" and stored in the data base in advance. Thereafter, it is possible to judge with the display of FIG. 14A whether the stored subscriber name and address name agree with the entered telephone number, and the stored location can be judged based also upon the map. When the setting button is touched, the destination can be set. In a case where it is desired to set not a location displayed in response to the telephone number but a nearby location as the destination on the basis of the map, the position changing button is touched. When this is done, scroll buttons in the form of arrows pointing up, down, left, right and diagonally are displayed so that the screen can be scrolled. By scrolling a location serving as the destination to the center of the map, any location can be set as the designation.

In this embodiment, a map display apparatus in the navigation system is described. However, it goes without saying that the invention may be applied not only in a vehicle navigation system but also as a map display apparatus used in city guidance or as a map display apparatus for some other use. Further, in entry of a telephone number for setting a destination, the subscriber name of a location, the location data name and the address name are displayed immediately before the map of the location corresponding to the entered telephone number is displayed. However, these data may be display in similar fashion even in a case where registration of a memory location utilized in setting of a destination is carried out by entry of a telephone number. It goes without saying that application may be performed in the same manner also with regard to entry of another telephone number.

In this embodiment, a telephone number is entered, the entered telephone number is displayed, the subscriber name and address name of the telephone number are retrieved and the retrieved results are displayed for a fixed period of time, after which a map centered on this location is displayed. However, a "Verify" key for performing verification and a "Return" key for performing entry again may be provided along with the telephone-number display field for displaying an entered telephone number and the retrieved-result display field which displays the subscriber name and address name. When the "Verify" key is operated in such case, the map is displayed. When the "Return" key is operated, a return is made to the screen (FIG. 13A) in the state for entry of telephone number. In any case, the entered telephone number, subscriber name and address name are displayed simultaneously, it is easy to verify an entered telephone number, e.g., to determine whether the number has been entered incorrectly, to change the telephone number and to confirm whether a store has changed.

Furthermore, this embodiment is particularly effective with regard to subscriber names having a high rate of change in terms of the telephone numbers carried in a classified telephone directory of retailers or the like. However, it goes without saying that the invention is also applicable to generally registered locations shown in FIG. 7 and that the same effects can be obtained in such case.

When a map of surroundings centered on a retrieved location is displayed in a case where location entry is performed by telephone number, the entered telephone number and the subscriber name or location name and address name of the registrant of this telephone number are displayed for a fixed period of time. As a result, whether the entered telephone number is correct or not can be confirmed in simple fashion based upon these names. Moreover, coordinates are stored in the directly retrieved telephone-number data file and address data for retrieving an address name from coordinates is arranged separated. This makes it possible to reduce the amount of data in the telephone-number data file. Further, according to this embodiment, the relationship between addresses and coordinates which seldom change is stored separated as fixed data. Therefore, in a case where an address corresponding to a telephone number changes and data is altered, it will suffice merely to change the coordinates in the registered telephone-number data. Consequently, data can be altered easier than in an arrangement where data is possessed in the form "telephone number—subscriber name—address name". Furthermore, in a case where telephone-number data is added on, it is possible to make the addition easily without requiring that address data be stored in the telephone-number data.

Next, an example will be described in which, when a location often utilized by the driver is registered in memory beforehand in the setting of a location such as a destination or transit point and this location is utilized when setting a location, information conforming to form at the time of registration is supplied, thereby making the setting of location easy.

If memory location registration is performed, registration is carried out by a method in which, after entry of a telephone number and selection of genre, an item is selected and entered from a list of the genre, or by a method in which a specific location or the like on a map is designated. A location thus registered is written in the RAM 42 with the coordinates of east longitude and north latitude of the registered point as well as the name, location and telephone number. The form used when writing the above into the RAM 42, namely a telephone number if entry was made by a telephone number or address if entry was made by an address, is employed to write into the RAM 42. As a result, when a registered location is called, it is possible for the user to select the registered location through easy verification. The details of memory location registration will be described below. First, as shown in FIG. 15, a registered-location data file stored in the information storage device 3 comprises index data having data such as a genre name and address and size of location data, and location data by genre category having data such as address data name, the reading thereof, east longitude and north latitude, map display scale and registered location number, these being provided for every items of location data. The location data by genre category is pointed to by the location data address and size of the index data, and each location data name can be retrieved from the genre name. In a case where selection is to be made from a registered location in entry of a location such as a destination or transit point, first the genre names are displayed based upon the index data and a desired genre is selected from these, whereupon location data by genre category is read out from the location data address and size of this genre name and the location data name is displayed. At this time the location data name is stored, as location data by genre category, in a fixed character-string order. The location data name is displayed in the fixed character-string order.

Location registration with respect to various input forms will be described by being divided into a form of input based upon a telephone number and a form of another type of input.

Figure 34A:
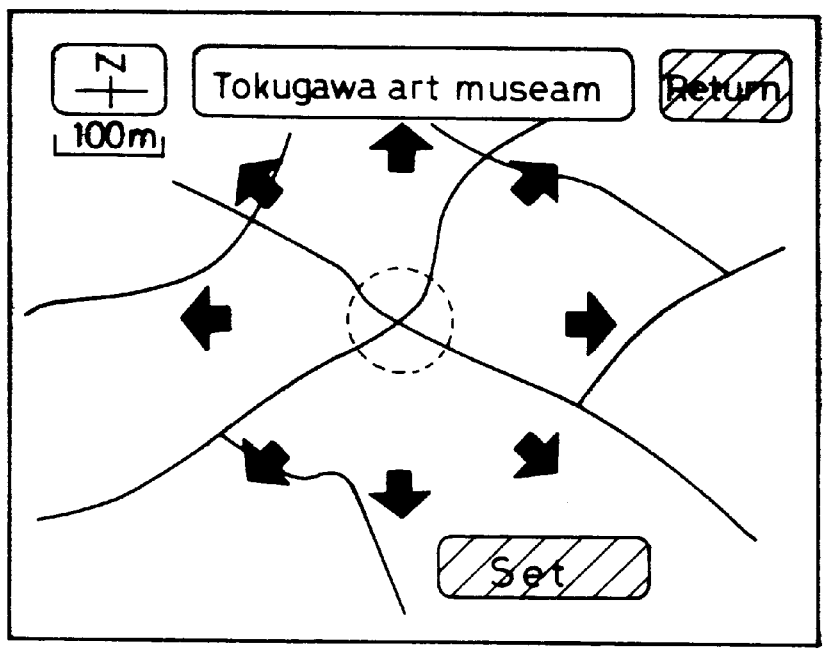
FIGS. 34A, 34B are diagrams for describing an example of a case in which a cursor is moved in excess of a predetermined distance when a location is registered.

By way of example, after entry based upon a telephone number is performed, a map is displayed centered on a location corresponding to the telephone number or centered on a representative location corresponding to the office number of the telephone number. Also in entry of an address or entry of a facility name, maps centered on locations corresponding to these entry forms are displayed. In a case where a location is registered based upon these inputs, the displayed map is scrolled by touching eight-direction cursors, as shown in FIG. 34A, thereby making it possible to move the center of the map.

A case in which location registration is performed by entry of a telephone number will now be described. When a telephone number is entered by telephone-number input means and a displayed map is scrolled, location traveling-distance sensing means determines whether the scrolled distance is within a predetermined distance (L1) (step S21).

If the traveling distance is within the predetermined range L1, then whether the entered telephone number is one that has already been registered in the storage device is determined based upon the telephone-number data shown in FIG. 6A (step S23). In a case where the telephone has been registered, whether the registered-telephone number data shown in FIG. 6B has name data corresponding to this telephone number is checked by name-data discriminating means (step S27). In a case where name data is present, the name is acquired by registered-name means (step S29) and the acquired name is registered as a memory location, together with the positional coordinates of the center of the map presently being displayed, by location registration means. In a case where name data is not found at step S27, the address name corresponding to the coordinates of the center of the map presently being displayed is acquired from the address data of FIG. 8 (step S31) and the acquired address name is registered as a memory location together with the coordinates of the center of the map (step S32). In a case where the traveling distance is judged to be larger than L1 at step S21, it is determined whether the traveling distance is L2 (L2≧L1) (step S28). If it is judged that the traveling distance is greater than L2, the address name is acquired from coordinates and this is registered as a memory location along with the coordinates (steps S31, S32). If the traveling distance is found to be less than L2 at step S28, the entered telephone number is registered as a memory location together with the coordinates of the center of the map currently being displayed (step S34). In other words, let S represent traveling distance by scrolling or the like sensed by the traveling-distance sensing means. If there is name data in a case where S≦L1 holds, the name data is acquired. If there is no name data, the coordinates corresponding to the entered telephone number are acquired and the address name is registered. If L1<S≦L2 holds, there entered telephone number is registered. When L2<S holds, the coordinates corresponding to the entered telephone number are acquired and the corresponding address name is registered.

Various modifications of the foregoing embodiment are possible. For example, in FIG. 16, an arrangement may be adopted in which, when the processing of step S28 is not performed and it is found at step S26 that the entered telephone number has not been registered, the program proceeds to the processing of step S34 and the entered telephone number is registered. Further, an arrangement may be adopted in which, when the processing of step S33 is not performed and it is determined at step S21 that the traveling distance is less than L1, the program proceeds to the processing of step S35, the address name is acquired from coordinates corresponding to the entered telephone number and the address name is registered.

In a case where registration is performed without much scrolling from the map display corresponding to the entered telephone number by carrying out memory location registration from the telephone number input by the foregoing steps, the user construes that the location corresponding to this telephone number has been registered and, in a case where there is name data, the name data can be registered. In a case where a certain amount of scrolling has been performed in the map display after entry of the telephone number, it is assumed that the location is not a location corresponding to the entered telephone number and that a neighboring point has been selected using a location corresponding to a representative telephone number as a landmark. In this case, the entered telephone number can be registered so as to effect registration in a form conforming as much as possible to the form of the input. As a result, in a case where a registered location is subsequently called, it is possible to present a display through which the user can readily verify which location is a memory location. However, in a case where a considerable amount of scrolling is performed after entry of the telephone number (e.g. a case where the display is scrolled to another local-office area far beyond the local-office area of the entered telephone number), the driver may be confused when the registered location is read out later. In such case the address name can be read out and registered from the coordinates of this location.

Figure 16:
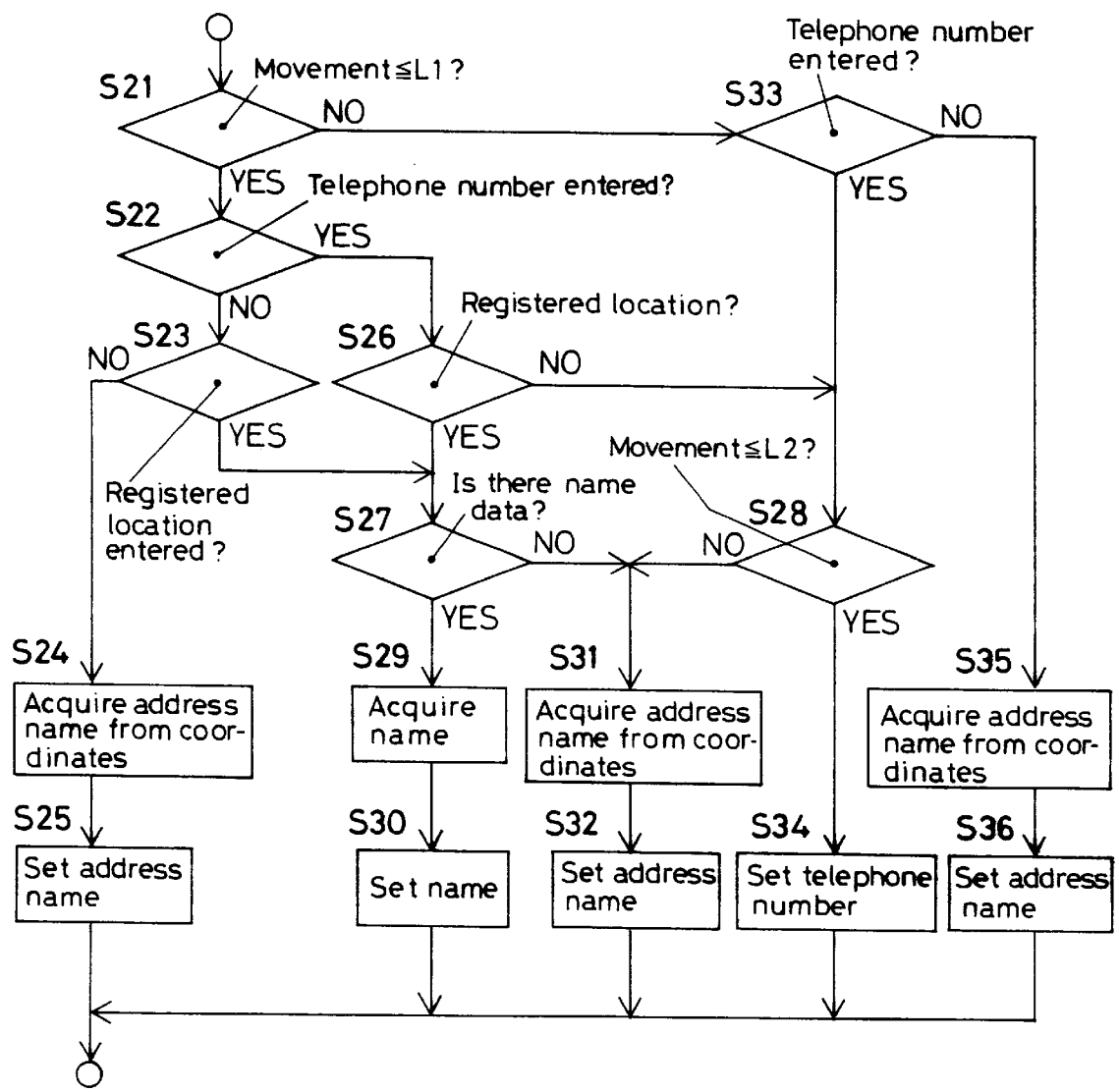
FIG. 16 is a flowchart for describing a flow for acquiring the names of locations in memory.

Reference will be had to FIG. 16 to describe a case in which location registration is performed in a form other than that of a telephone-number input, such as input of an address name, input of a facility name or designation and entry of a location on a map. First, when an input is made in various forms by the input means and the corresponding map display is presented, traveling-distance sensing means determines whether movement of the map by scrolling is within a predetermined distance (L1) (step S21). If movement is within the predetermined range L1, then it is determined by input-form sensing means whether the input form has selected an item from a genre already registered in the system, such as "Address" of an input key, "Golf Course" or "Other Facility" of facility name, shown in FIG. 17. That is, it is determined by the input-form sensing means whether a location is a registered location (step S23). In case of a registered location, it is determined by name-data discriminating means whether a name has been registered in the data (step S27). If a name has been registered, the name data is acquired by name-data discriminating means (step S29) and the acquired name is registered as a memory location, along with the positional coordinates of the center of the map presently being displayed, by location registration means (step S30). In a case where the scrolling or other distance is judged to be outside the predetermined range at step S21, a case where there is no input of registered location at step S23 or a case where there is an input of registered location but there is no name data at step S27, the address name is acquired from the coordinates of the center of the displayed map and the address name is registered as a memory location together with the coordinates.

In the case of such an input form, e.g., a case in which input is made from a location already registered in the system, namely a case in which a genre is selected and an item contained in this genre is selected to register a location, the selected and entered name can be registered as a location along with the coordinates and recognition is easy also when the registered location is called.

Next, the flow of operation for memory location registration will be described while giving a specific illustration of screen arrangement.

Figure 19A:
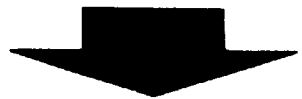
FIGS. 19A, 19B are diagrams for describing an example of operation for registering a location by entry of a telephone number.
Figure 19B:
Figure 21A:
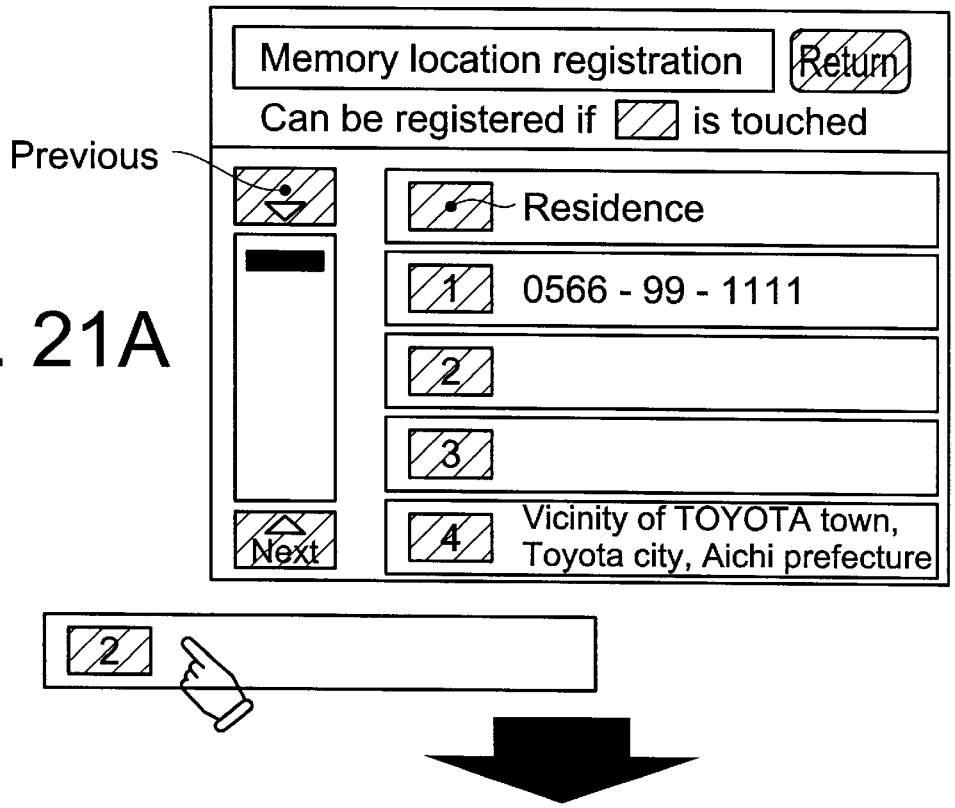
FIGS. 21A, 21B are diagrams for describing an example of operation for registering a location by entry of a telephone number.
Figure 21B:
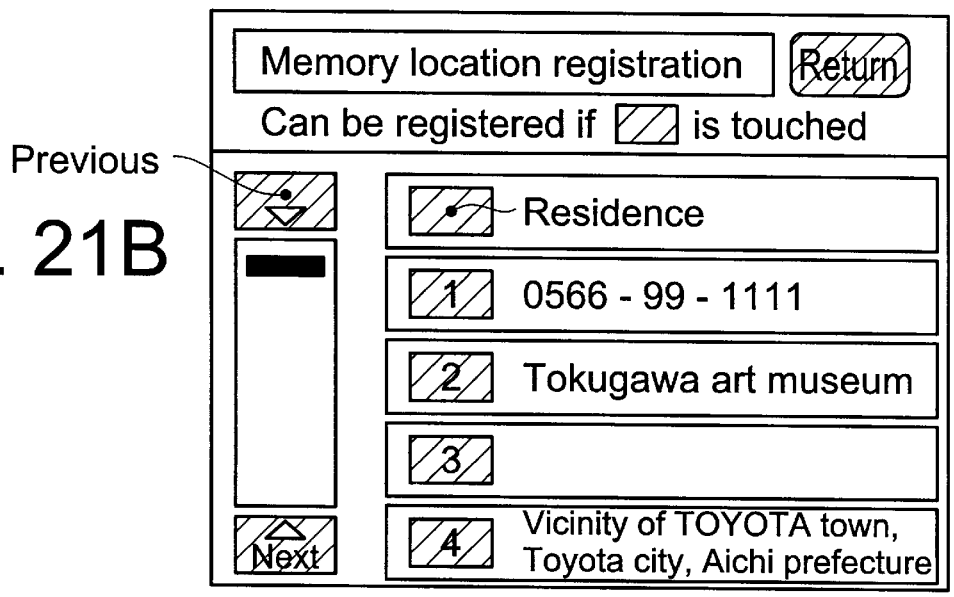

When "Telephone Number" is selected from a menu screen via "Memory Location Registration", a screen is displayed for entry of a toll number by the ten-key pad, as shown in FIG. 19A. When the telephone number is entered, the number "052-935-6262" is displayed, as shown in FIG. 19B, a previously entered classified telephone directory, for example, is retrieved and the registered name is displayed, as shown in FIG. 20A. Thereafter, a map of the surroundings centered on the registered location of the entered telephone number is displayed on the screen. When a "Set" button is touched upon confirming the position on the screen, the memory location is registered by the telephone number "052-935-6262" in, say, a "2" row in accordance with a designation of registration area, as illustrated in FIG. 21.

Further, when "Address" of memory location registration is selected, as shown in FIG. 22B, first a list of prefectures and principal cities is displayed in fixed character string order, as shown in FIG. 23A. Then, in accordance with selections made, "Nagoya City" is displayed from the prefecture names, "Naka Ward" is displayed and, as shown in FIG. 24A, a display is presented from "Sakae" to "City Block 1" in the order city→ward→town→city block. Then, as illustrated in FIG. 25A, a map of surroundings centered the selected address is finally displayed on the screen. When a "Set" button is touched upon confirming the position on the screen,, the memory location is registered by the address "Vicinity of First City Block, Sakae, Nagoya City, Aichi Prefecture" entered in, say, a "2" row in accordance with a designation of registration area, as illustrated in FIG. 26.

Figure 30:
FIG. 30 is a diagram for describing an example of operation for registering a location by entry of facility name.

When, say, "Golf Course" is selected from among the facility names of memory location registration, as shown in FIG. 27A, all in-country golf courses and the golf courses in each prefecture are displayed in a fixed character string order, as shown in FIG. 28A, and golf courses "Aichi CC", "Aoi CC" of "Golf Courses in Aichi Prefecture" in the selected district are displayed. A map of surroundings centered on the finally selected golf course is displayed on the screen, as depicted in FIG. 29A. When a "Set" button is touched upon confirming the position on the screen, the memory location is registered by the golf course name "Aichi CC" entered in accordance with a designation of registration area, as illustrated in FIG. 30.

Figure 34B:
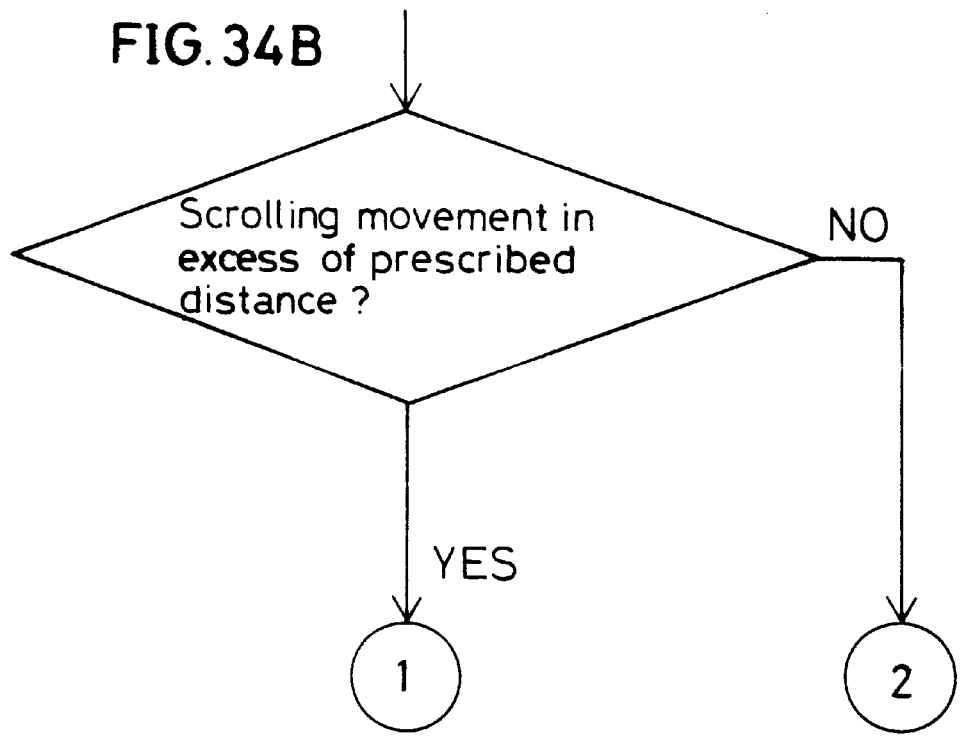
Figure 36:
FIG. 36 is a diagram for describing an example of a case in which a cursor is moved in excess of a predetermined distance when a location is registered.
Figure 38:
FIG. 38 is a diagram for describing an example of a case in which a cursor is moved in excess of a predetermined distance when a location is registered.

When another facility is selected from among the facility names of memory location registration, as shown in FIG. 31A, the genres "Amusement Parks, "Ski Slopes", "Parks", "Zoos", etc., are displayed, as shown in FIG. 32A, then the names of facilities of a selected genre "Art/Natural History" are displayed in a fixed character string order, as illustrated in FIG. 32B. When the facility name "Tokugawa Art Museum" is finally selected, a map of surroundings centered on the position of this facility is displayed, as illustrated in FIG. 33B. "Tokugawa Art Museum" is displayed as the location name at the top of the map screen. However, if a "Change Position" button on the map is touched, up, down, left, right and diagonal cursor buttons are displayed, as illustrated in FIG. 34A. When any of these buttons is touched, the screen is scrolled to move the map. When such movement has been made, it is determined whether scrolling movement in excess of a predetermined distance has been performed, as shown in FIG. 34B. In case of scrolling movement greater than the predetermined distance, the location name at the top of the map screen is erased. When the "Set" button is touched, as shown in FIG. 35A, the location is registered by the address name "Vicinity of Kodeki town, Chigusa ward, Aichi Prefecture" of the position in, say, a "2" row in accordance with a designation of registration area, as illustrated in FIG. 36. However, when the "Set" button is touched, as shown in FIG. 37A, in a case where scrolling movement is not greater than the predetermined distance, the memory location is registered by the facility name "Tokugawa Museum" in, say, a "2" row in accordance with a designation of registration area, as illustrated in FIG. 38.

Figure 40:
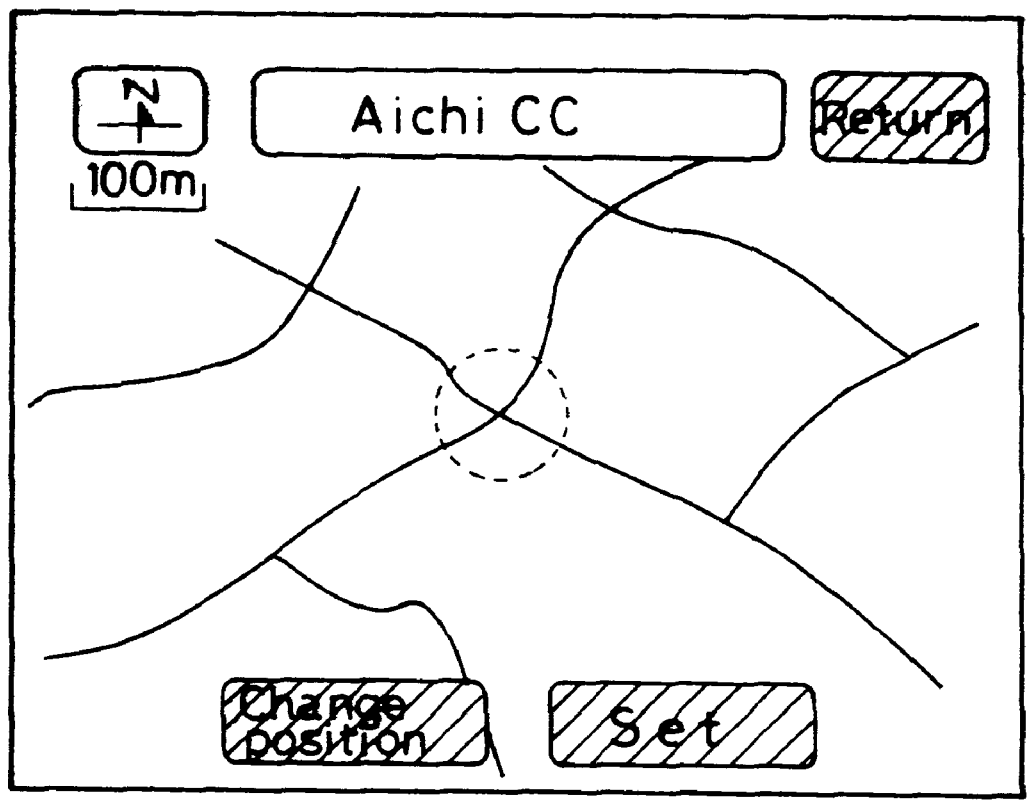
FIG. 40 is a diagram for describing an example of a case in which a location that has been registered in the system is selected when a destination or transit point is set.

The name has been stored together with the coordinates of a location in the memory location registered by the embodiment or in location data registered in the system in advance. Therefore, in a case where a destination or transit point, etc., is selected from these registered locations and designated so that a route search may be carried out, as shown in FIG. 39B and FIG. 40, display of the selected registered location can be performed and the user can verify the location that is to be set. The details will be described below.

First, in FIG. 39A, a menu for setting destination is displayed. For example, when "Menu Location" is selected, the registered memory location is displayed in the form of a list, as shown in FIG. 39B. When "Aichi CC" is selected, for example, a map display centered on Aichi CC is presented, as illustrated in FIG. 40. Also displayed are a "Change Position" key for scrolling and a "Set" key for setting the center of the map as the destination or transit point, etc. On the map display shown in FIG. 40, the name of the location selected, as in the manner of "Aichi CC", is read out of the registered-location data and displayed, whereby the user can perform confirmation when a position setting is made. Besides a case where an entry is made from a location that has undergone memory location registration in the manner described above, a telephone number input or address input is made or a location is entered by selecting an item from genres that have been registered in the system. Also, in a case where a location such as a designation or transit position is selected, the display of a name may be presented on the map screen, displayed after entry is made, in conformity with the form entered.

Furthermore, in the above-described embodiment, names, telephone numbers and address names are used as registered information. However, combinations of these or other information may be added on.

According to the present invention, in a case where a location is registered in advance in order to be used in entry of a location, as described above, location input information such as a name or telephone number used in designating and entering a location is adopted as registered information. As a result, with regard to a telephone number, specific name of a golf course and name of a facility close to information relating to a location routinely recognized, these contents can be adopted as registered information. Accordingly, even if registered information is used to enter a location such as a destination or transit point, results are easy to understand and it is possible to prevent misjudgments and erroneous recognition.

Figure 41:
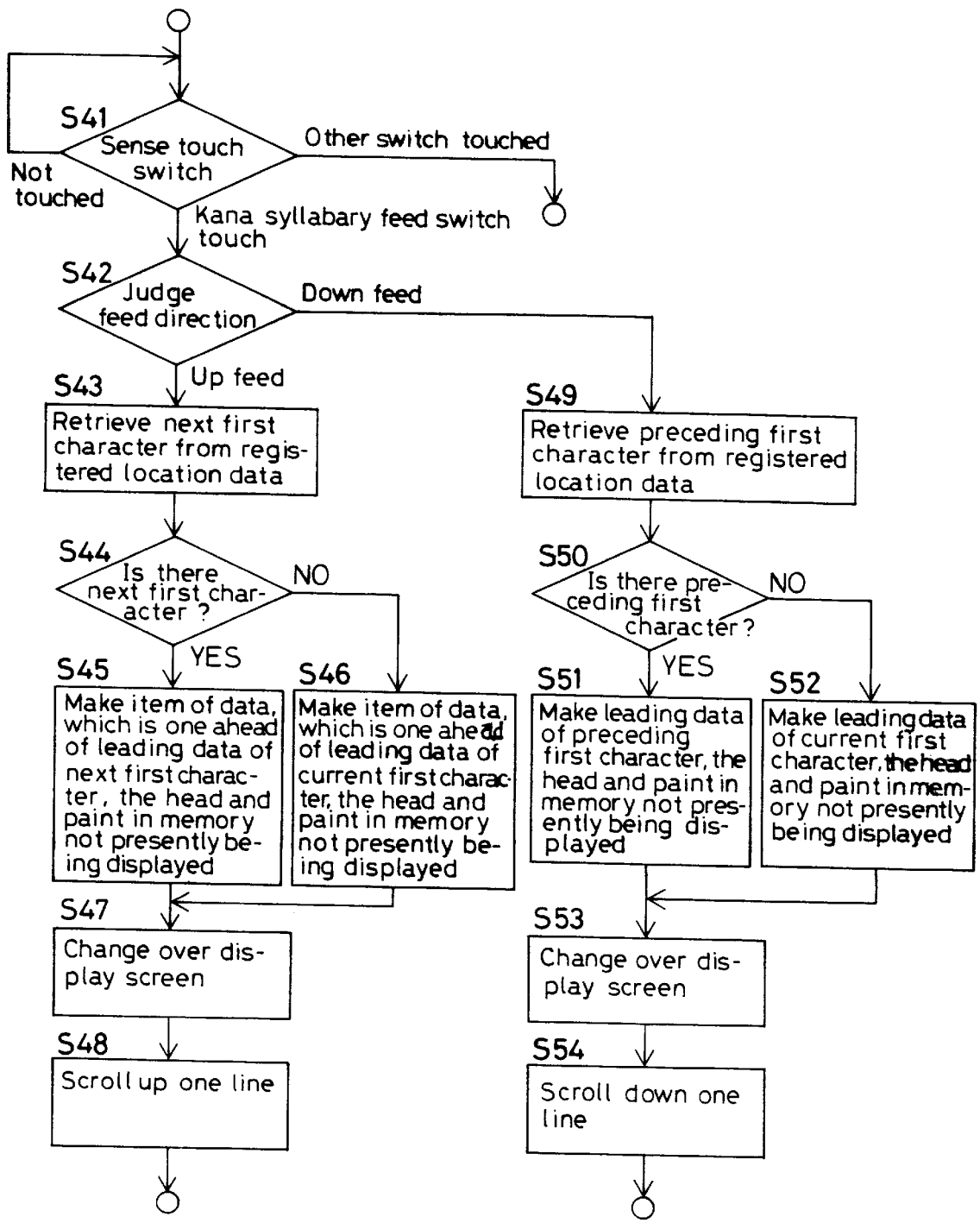
FIG. 41 is a diagram for describing the flow of processing for search scrolling.

If a designation is selected from the registered locations at the destination setting (step S2) in the flowchart shown in FIG. 9, location data names are read out of the location data, classified by genre, in accordance the designated genre and the location data names are displayed in a window over a plurality of lines below first characters in a fixed character string order. At the same time, a search scroll button and a scroll button for line feed are displayed. When search scroll button is touched in order to search for a prescribed location data name, the line of the first character first is displayed in front of a prescribed position and then one line is scrolled to move to the prescribed position. FIG. 41 illustrates the flow of processing for search scrolling.

In the processing for search scrolling, the system waits for a touch switch to be touched (step S41), as shown in FIG. 41. When a fixed character-string feed (search scroll button) switch is touched, the feed direction is judged (step S42).

In a case where the feed direction is up, the next first character is retrieved from the registered location data (step S43) and it is determined whether there is a next first character (step S44). If there is, the item of data one ahead of the leading data of the next first character is made the head and is painted in a memory not presently being displayed (step S45). In a case where there is no next first character, the item of data one ahead of the leading data of the current first character is made the head and is painted in a memory not presently being displayed (step S46). The display screen is switched over to this memory and the head of the name list painted is displayed in a form superimposed on the uppermost window (step S47). The display is then scrolled up one line (step S48).

In a case where the feed direction is downward, the preceding first character is retrieved from the registered location data (step S49) and it is determined whether there is a preceding first character (step S50). If there is, the item of data one ahead of the leading data of the preceding first character is made the head and is painted in a memory not presently being displayed (step S51). In a case where there is no preceding first character, the item of data one ahead of the leading data of the current first character is made the head and is painted in a memory not presently being displayed (step S52). The display screen is switched over to this memory and the second line of the painted name list is displayed in a form superimposed on the uppermost window (step S53). The display is then scrolled up one line (step S54). Here the processing of steps S45, S46 and steps S51, S52 represents scrolling control by first scroll control means and the processing of step S48 and step S54 represents scrolling control by second scroll control means.

Figure 42:
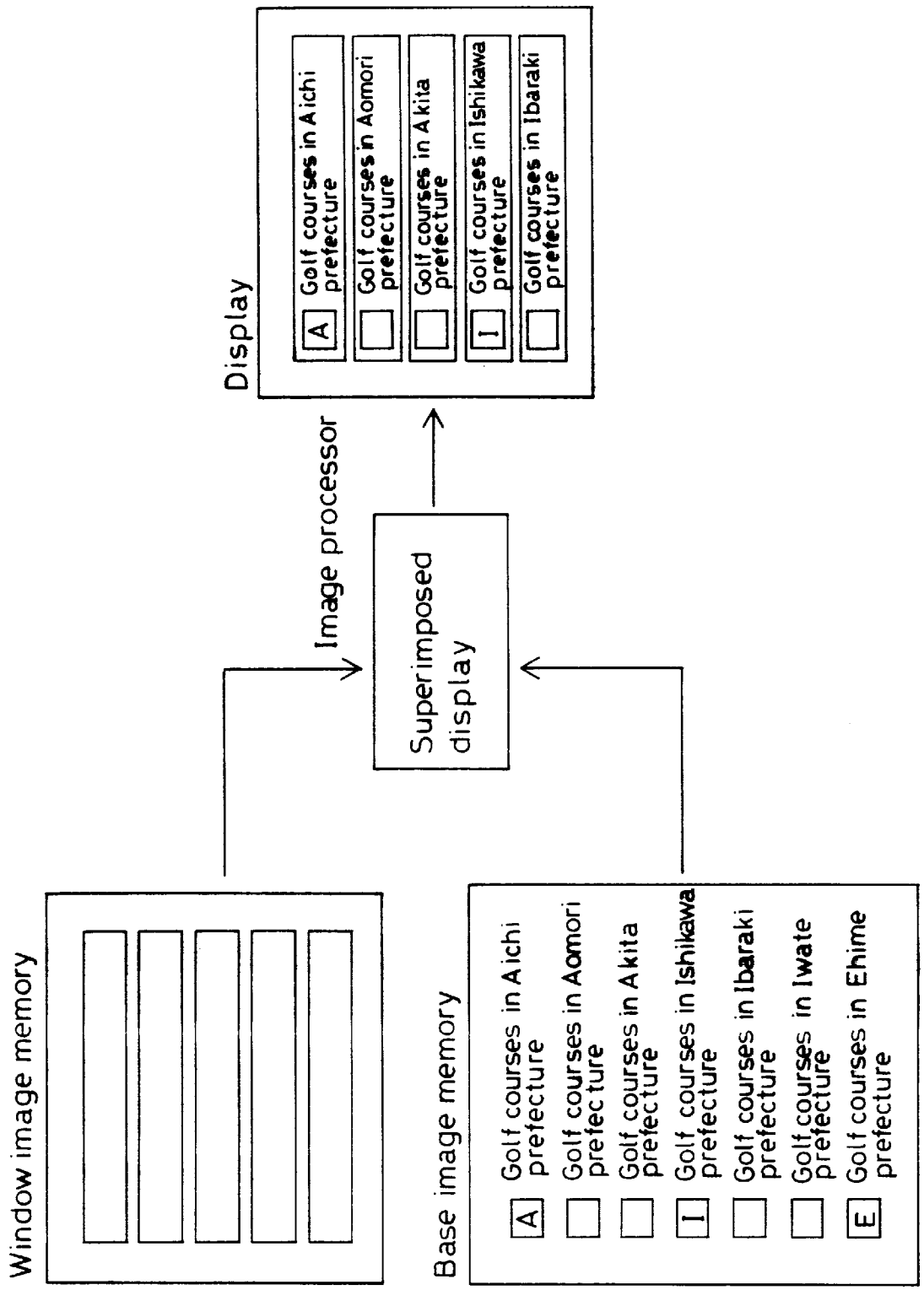
FIG. 42 is a diagram showing the basic constitution of data processing in display of image data.

In destination setting and the like, the basic arrangement in image data display for a case in which location data name is displayed according to genre involves painting the window in the window image memory (first image memory), as shown in FIG. 42, painting the first character of the fixed character string and the location data name in a base image memory (second image memory) and displaying these in a superimposed form by an image processor. The image memory 44 is used for the window image memory. On the other hand, in a case where the search display of the present invention is presented, the base image memory is constituted by two memories, namely a first memory and a second memory, ad illustrated in FIG. 43. if, say, a fixed character string is touched when the window image memory and the first memory of the base image memory are being superimposed by the image processor and displayed, the next first character is retrieved from the registered location data and the location name list is painted in the second memory of the base image memory from the item of data one ahead of the next first character. In response to the end of painting, the base image memory is switched over from the first memory to the second memory, the images are superimposed and displayed by the image processor and then one line of scrolling is performed. Thus, in a case where a search is made from the first character "A" to the next first character "I", as shown in FIG. 43, first "I" is displayed one line down and then scrolling is performed to the very top.

Figure 17:
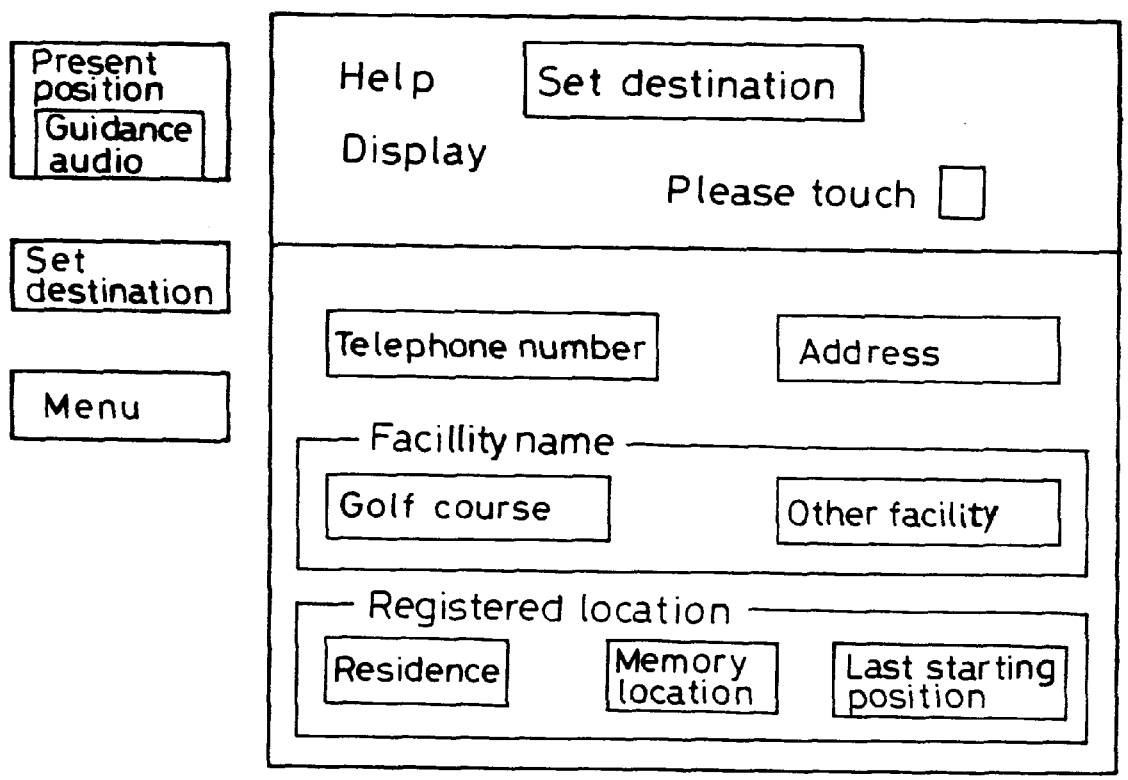
FIG. 17 is a diagram showing an example of the arrangement of a screen for setting a target value.
Figure 44A:
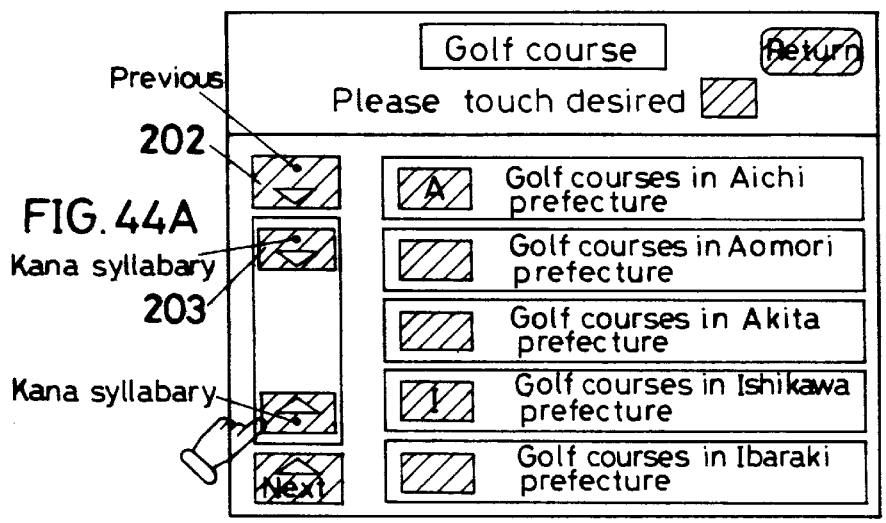
FIGS. 44A, 44B are diagrams for describing an example of a change in a search display.

When, say, the "Golf Course" button of facility name is touched on the destination setting screen of FIG. 17, an index screen of facility names of the kind shown in FIG. 44A is displayed. The index screen is composed of a data display field 201 which displays index data regarding golf courses, a one-line feed scroll button 202 comprising "Previous" and "Next" buttons for the purpose of scrolling in a case where information displayed in the display field is not desired information, and a "Kana Syllabary" (fixed character string) search scroll button 203, which is movement designating means in the present invention. The information displayed in the display field is arranged in the order of a fixed character string. The first character of the fixed character string is attached to the head of the fixed character string by category. If touching of the "Kana Syllabary" search scroll button 203 is sensed, then the first character corresponding to "Previous" or "Next" of the head first character being displayed in the present display field is retrieved by the attached first character of the fixed character string and control is performed to perform scrolling movement in such a manner that the first character is brought to the head of the display field. Specifically, in the state of FIG. 44A, for example, when the "Kana Syllabary" search scroll button 203 is touched one time, scrolling is controlled in such a manner that the head of the line "I" is displayed at the head position of the display field. In a case where the "Kana Syllabary" search scroll button 203 is pressed continuously, search scrolling of each line is repeated in the order of the fixed character string (or in the reverse direction) during the time that button is being pressed. In other words, after the head of each line is stopped at the head position of the display field for a prescribed period of time, the head of the next line is displayed at the head position. When it is sensed that the "Kana Syllabary" search scroll button 203 has been released, at this moment the head of the next line to be displayed next is displayed at the head position of the display field in a case where scrolling processing is being executed. In a case where it is sensed that the "Kana Syllabary" search scroll button 203 is released when the head of the line has been stopped at the head position of the display field for a prescribed period of time, the display prevailing at this moment is maintained as is. Now, if the "Kana Syllabary" search scroll button 203 in the "Next" direction is pressed, search scrolling is executed in the reverse order of the fixed character string.

Figure 44B:
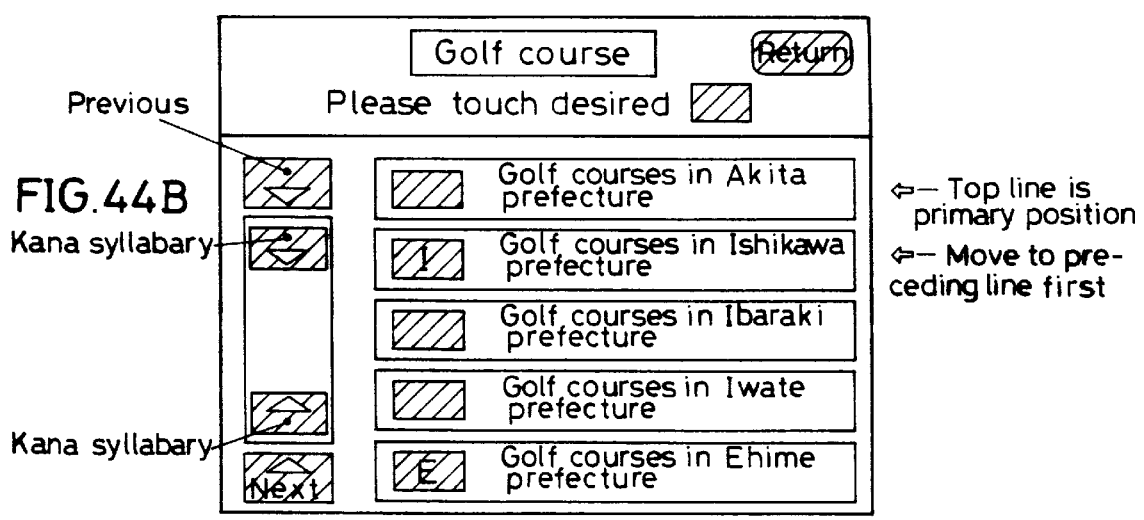

In order to display the first character of the fixed character string at the head position of the display field, scroll control is performed in such a manner that the first character of the fixed character string is moved to a position one line before the head position of the display field and control is performed to scroll from the above-mentioned position to the head position of the display field. In other words, in accordance with the Figure, when the upward feed button of the "Kana Syllabary" search scroll button 203 is pressed one time in the state of FIG. 44A, the head of the "I" line is moved one line short (to the second position) of the head position of the display window displayed in the display field, as shown in FIG. 44B, after which it is scrolled to the head position of the display window, as illustrated in FIG. 45B. Further, in a case where the "Kana Syllabary" search scroll button 203 is pressed continuously, this processing is repeated to perform display control.

Figure 43:
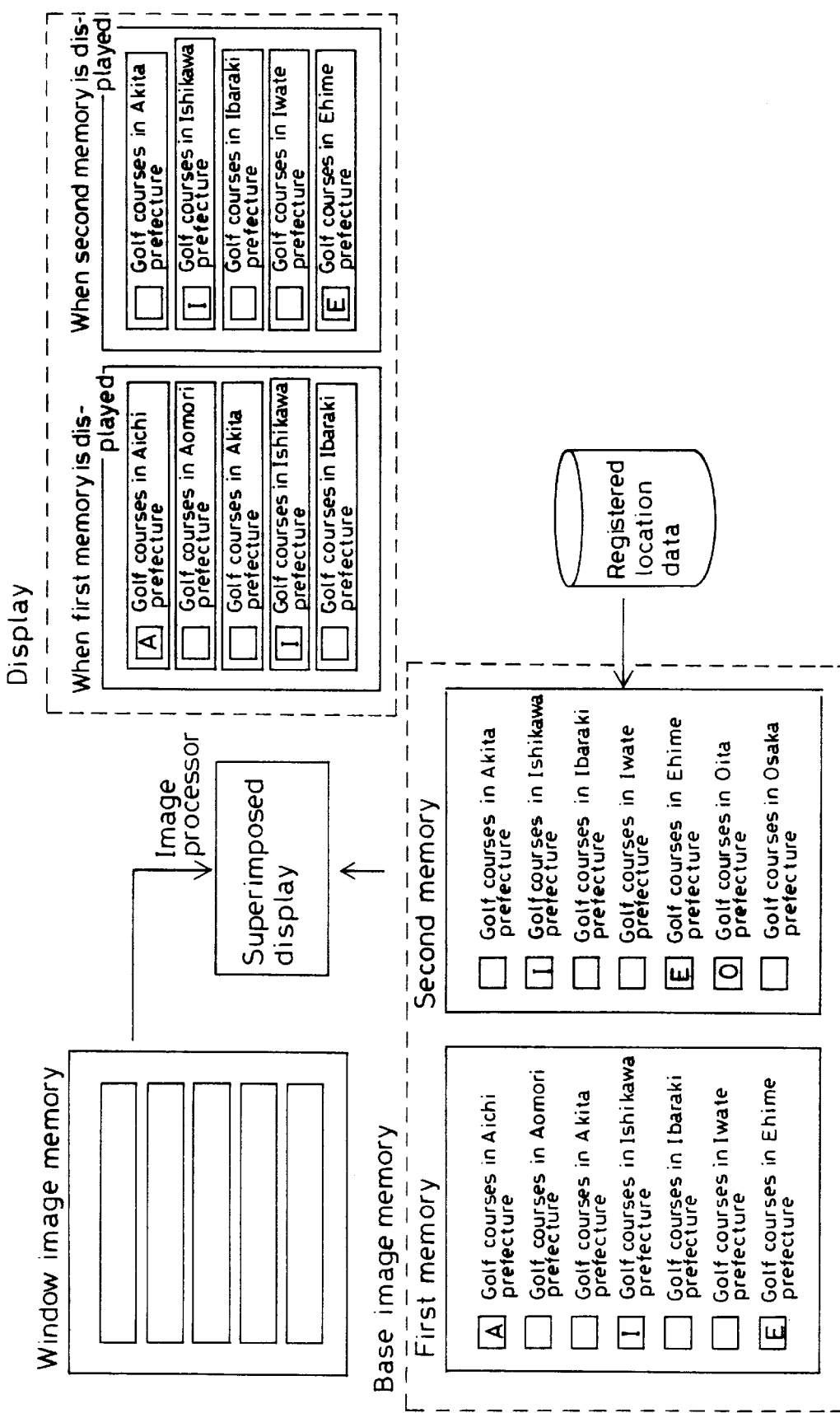
FIG. 43 is a diagram for describing an example of data processing in a search display.

In this case, data is read out of the window image memory shown in FIG. 43, namely out of the first image memory storing the data representing the display window, painting control is performed in a state in which the display window displayed in the display field is held fixed, as shown in FIG. 44A, and the data read out of the base image memory, namely the second image memory storing the information data, is rewritten and painted in accordance with scrolling of the information displayed in the display field. Movement is then performed so that the information is made to pass under the window, as shown in FIG. 45B. As a result, the direction in which characters move at the time of scrolling can readily be ascertained and search scrolling can be performed with ease. In particular, in a case where the scroll button is pressed continuously and the line desired to be displayed is moved to the head position of the list and selected, the fact that the above-described arrangement has been adopted means that a selection can be made quickly by searching for the head of each line in the order of the fixed character string. In addition, the direction of scrolling can recognized with ease. When this is used in an automotive vehicle, a display apparatus having excellent visual effects is required. In the conventional apparatus, the display moves momentarily when a search is performed and the scrolling direction can no longer be understood in the course of scrolling. By virtue of the arrangement of this embodiment, however, the direction of scroll flow is easy to recognize and the character displayed next is readily predicted. This makes it possible to prevent excessive scrolling.

In the foregoing embodiment, the primary position is made the uppermost line. However, an intermediate position may by made the primary position. Further, an example is illustrated in which the golf course genre is designated by setting a destination. However, it goes without saying that the invention can be applied similarly to other facilities and addresses and can be applied similarly to memory location registration. Furthermore, in this embodiment, location data classified by genre is arrayed in the order of a fixed character string. However, order may be alphabetical. Though the location data by genre is arrayed and stored in the order of a character string decided in advance, it may be rearranged when, say, a display is presented based upon the reading of data. This makes it easy to add on and change data. Further, in the foregoing embodiment, it is described that a touch switch is used as the input section for designating scrolling and designating selection. However, this does not impose a limitation upon the invention for an input unit such as a remote controller or keyboard may be used.

According to the present invention, a first character in a fixed character string and an underlying location data name are arrayed and displayed in a display field in a window extending over several lines, and movement is performed by a search scrolling button and a single-line feed scroll button in order to change and set the displayed information. In a case where search scrolling is performed by designation of movement designating means, the line of the first character is first displayed one line before (at a second prescribed position) a primary position (a first prescribed position) with respect to the scroll feed direction. This makes prediction easy and prevents excessive scrolling. Further, since the window is held fixed and the first character and location data name are moved so as to pass under the window, the direction of character movement at the time of scrolling can be made easy to ascertain.

As many apparently widely different embodiments of the present invention can be made without departing from the spirit and scope thereof, it is to be understood that the invention is not limited to the specific embodiments thereof except as defined in the appended claims.

What is claimed is:

1. A navigation system comprising:

input means for entering a telephone number;

information storage means for storing telephone-number data, in which at least a location name inclusive a set of coordinates is stored for each telephone number, address data, and map data;

a central processor having telephone-number retrieval means for retrieving, from said information storage means, location coordinates and location name of a telephone number entered by said input means, and address-data retrieval means for retrieving address data corresponding to the telephone number entered by said input means; and display means for displaying a location name and address, which have been retrieved by said central processor, as well as a map on the basis of location coordinates, which have been retrieved by said central processor;

said central processor being such that when a telephone number is entered by said input means, a location name inclusive of location coordinates of said telephone number stored in said information storage means is retrieved on the basis of said telephone number and an address of said address data is retrieved on the basis of said location coordinates to display said entered telephone number and said retrieved location name and address on said display means, and after the lapse of a given time or when an order for confirmation of what is displayed is entered, a map is displayed through the map data stored in said information storage means on the basis of said location coordinates to perform designation and input of a location from said displayed map.

2. The navigation system according to claim 1, wherein said telephone-number data has registered-location classification data representing classification of registered locations, said telephone-number retrieval means has discriminating means for discriminating said registered-location classification, and said address-data retrieval means retrieves an address from said address data based upon results of discrimination by said discriminating means.

3. The navigation system according to claim 2, wherein said telephone number data has said location name as well as a subscriber name stored for each telephone number, said registered-location classification data is data indicating whether or not it is registered data of said subscriber name, and said address-data retrieval means retrieves an address from said address data only when said classification data is determine to be the registered data of the subscriber name.

4. A navigation system comprising:
input means for entering a telephone number;
information storage means for storing telephone-number data, in which at least a location name inclusive a set of coordinates is stored for each telephone number, address data, and map data;
a central processor having telephone-number retrieval means for retrieving, from said information storage means, location coordinates and location name of a telephone number entered by said input means, and address-data retrieval means for retrieving address data corresponding to the telephone number entered by said input means; and
display means for displaying a location name and address, which have been retrieved by said central processor, as well as a map on the basis of location coordinates, which have been retrieved by said central processor;
said central processor being such that when a telephone number is entered by said input means, a location name inclusive of location coordinates of said telephone number stored in said information storage means is retrieved on the basis of said telephone number and an address of said address data is retrieved on the basis of said location coordinates to display said entered telephone number and said retrieved location name or address on said display means, and after the lapse of a given time or when an order for confirmation of what is displayed is entered, said telephone number is registered in a memory in a registered location-information form which is accessed in a list form upon input of designation of location.

5. The navigation system according to claim 4, wherein said central processor allows a location name and address retrieved on the basis of said telephone number on said display means, and registers said location name or address after a map has been displayed on the basis of location coordinated retrieved on the basis of said telephone number.

6. The navigation system according to claim 5, wherein said telephone number data has said location name as well as a subscriber name stored for each telephone number, said registered-location classification data is data indicating whether or not it is registered data of said subscriber name, and said address-data retrieval means retrieves an address from said address data only when said classification data is determined to be the registered data of the subscriber name.

7. The navigation system according to claim 4, wherein said telephone-number data has registered-location classification data representing classification of registered locations, said telephone-number retrieval means has discriminating means for discriminating said registered-location classification, and said address-data retrieval means retrieves an address from said address data based upon results of discrimination by said discriminating means.

8. A navigation system having a function for registering a location designated on a map, said navigation system comprising:
input means for entering a location according to an input-form selected from a plurality of input-forms inclusive of an input-form by a telephone number,
memory means for storing information and a map regarding a location conforming to said plurality of input-forms,
a control unit having input-form detecting means for detecting an input-form selected by said input means, discriminating means for discriminating information regarding a location entered by said input means, and registering means for registering information regarding a location discriminated by said input means corresponding to an input-form detected by said input-form detecting means, and
display means for displaying information and a map regarding a location when information regarding said location entered by said input means is registered in said control unit,
said control unit comprising a name-date discriminating means for discriminating where or not a location entered by said input means has name data, so that when the location entered in an input-form by a telephone number is judged by said name data-discriminating means to have name data, the name is registered as said location information, and when said location is judged to have no name data, an address is registered as said location information.

9. The navigation system according to claim 8, wherein said control unit registers said location information in said registering unit upon display on said display means corresponding to said input-form.

10. The navigation system according to claim 8, wherein said control unit allow a map to be displayed together with location information conforming to said input-form on the basis of said location, and then registers said location information in said registering means.

11. The navigation system according to claim 8, wherein said display means comprises a shift means for shifting a center location of the map displayed on said display means, and said control unit is such that when said center location of the map displayed on said display means is shifted by said shift means, said location information is registered in said registering means while an address is displayed of said center location on the map after said shift.

12. The navigation system according to claim 8, wherein said input-form takes the form of an establishment name input of said location, and said control unit displays said establishment name and a map on the basis of a location corresponding to said establishment name and then registers said establishment name in said registering means.

13. The navigation system according to claim 8, wherein said input-form takes the form of an address name input of said location, and said control unit displays said address name and a map on the basis of a location corresponding to said address name and then registers said address name in said registering means.

14. A navigation system comprising:

display means for displaying information regarding a location and a map, input means for entering a telephone number and moving a map displayed on said display means, storage means for storing at least a telephone number, information regarding a location and a map, and a central processor having telephone number-discriminating means for discriminating whether or not a telephone number entered by said input means is stored in said storage means, telephone number retrieving means for retrieving information regarding a location corresponding to the telephone number entered by said input means, and registering means for registering therein information regarding a location retrieved by said telephone number-retrieving means, wherein:

said storage means stores therein information regarding a typical location corresponding to an area code of the telephone number, and said central processor is such that when a telephone number is entered by said input means, said telephone number is discriminated to retrieve the information regarding a location, and when said telephone number is determined to be not stored in said storage means, information regarding a typical location corresponding to the area code of said telephone number is retrieved to display a map on said display means based on said retrieved information, and information regarding a location corresponding to a distance of movement of said displayed map caused by said input means is registered in said registering means.

15. The navigation system according to claim 14, wherein said central processor is such that when said distance of movement is greater than a predetermined distance, an address name and coordinates are registered in said registering means in the form of information regarding a location.

16. The navigation system according to claim 14, wherein said central processor is such that when said distance of movement is less than a predetermined distance, a telephone number and coordinates are registered in said registering means in the form of information regarding a location.

* * * * *